(12) United States Patent
Yagi et al.

(10) Patent No.: US 11,703,625 B2
(45) Date of Patent: Jul. 18, 2023

(54) LIGHTING DEVICE AND DISPLAY DEVICE

(71) Applicant: SHARP KABUSHIKI KAISHA, Sakai (JP)

(72) Inventors: Shugo Yagi, Sakai (JP); Takeshi Masuda, Sakai (JP); Yuuichi Kanbayashi, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

(21) Appl. No.: 17/728,443

(22) Filed: Apr. 25, 2022

(65) Prior Publication Data

US 2022/0390661 A1  Dec. 8, 2022

Related U.S. Application Data

(60) Provisional application No. 63/196,492, filed on Jun. 3, 2021.

(51) Int. Cl.
*F21V 8/00* (2006.01)

(52) U.S. Cl.
CPC .......... *G02B 6/0028* (2013.01); *G02B 6/003* (2013.01); *G02B 6/0016* (2013.01); *G02B 6/0036* (2013.01); *G02B 6/0038* (2013.01); *G02B 6/0045* (2013.01)

(58) Field of Classification Search
CPC .... G02B 6/0028; G02B 6/0016; G02B 6/003; G02B 6/0036; G02B 6/0038; G02B 6/0045
See application file for complete search history.

(56) References Cited

U.S. PATENT DOCUMENTS

| | | | | |
|---|---|---|---|---|
| 8,746,909 B2* | 6/2014 | Chen | ................. | G02B 6/0025 362/616 |
| 2003/0026106 A1* | 2/2003 | Knaack | ................. | G02B 6/001 362/555 |
| 2007/0171678 A1* | 7/2007 | Shim | ................. | G02B 6/0018 362/616 |
| 2008/0231590 A1* | 9/2008 | Choi | ................. | G02B 6/0038 345/102 |

(Continued)

FOREIGN PATENT DOCUMENTS

| | | |
|---|---|---|
| JP | 2018-106826 A | 7/2018 |
| JP | 2021-051965 A | 4/2021 |

*Primary Examiner* — Fatima N Farokhrooz
(74) *Attorney, Agent, or Firm* — ScienBiziP, P.C.

(57) ABSTRACT

A lighting device includes light sources arranged in an arrangement direction, a first light guide plate, and a second light guide plate on the first light guide plate. The first light guide plate includes a first light entering surface, a first light exit surface, and a first light diffusion portion adding a diffusion action to light to be refracted and travel in a crossing direction crossing the arrangement direction. The second light guide plate includes a second light entering surface, a second light exit surface, and a second light diffusion portion adding a diffusion action to light to be refracted and travel in the arrangement direction seen from the normal direction of the second light exit surface. The second light diffusion portion includes first lenses that include ridgelines extending in the crossing direction and inclined portions inclined at an angle from 35° to 55° inclusive relative to the normal direction.

13 Claims, 19 Drawing Sheets

(56) References Cited

U.S. PATENT DOCUMENTS

| | | | |
|---|---|---|---|
| 2009/0051719 A1* | 2/2009 | Kuwahara | B41J 2/16526 347/92 |
| 2009/0128735 A1* | 5/2009 | Larson | G02B 6/0018 362/244 |
| 2010/0302135 A1* | 12/2010 | Larson | G02B 6/0021 345/102 |
| 2017/0131455 A1* | 5/2017 | Asano | G02B 6/0038 |
| 2019/0227382 A1 | 7/2019 | Watanabe et al. | |
| 2021/0096427 A1 | 4/2021 | Yagi et al. | |

* cited by examiner

FIG.14
| | EXAMPLE 1 |
|---|---|
| RIDGELINE DIRECTION IN SECOND SECTION | Y-AXIS DIRECTION (PRISM) |
| RIDGELINE DIRECTION IN THIRD SECTION | X-AXIS DIRECTION AND Y-AXIS DIRECTION (PRISM) |
| IMAGE | 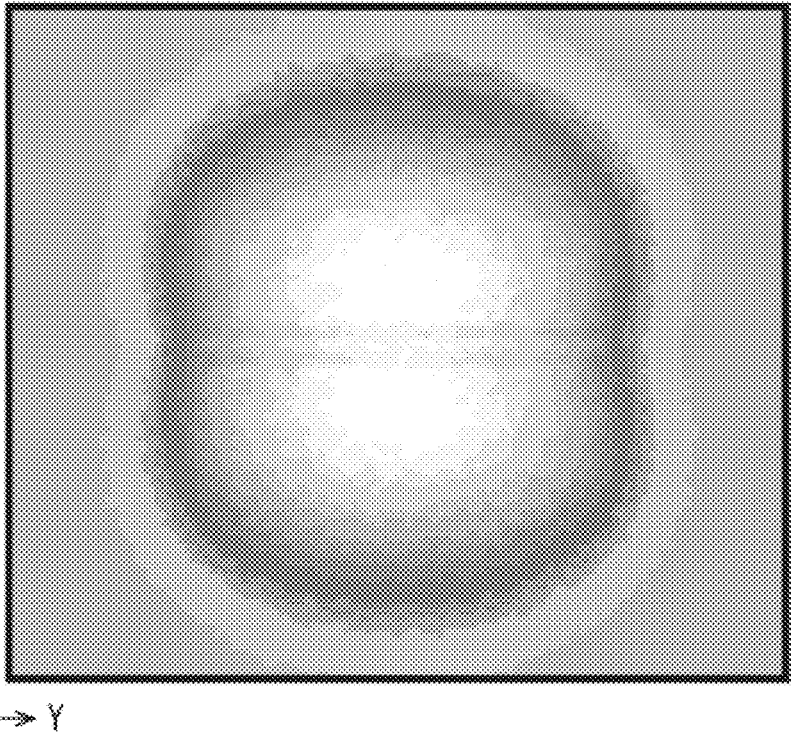 |
| GRAPH | 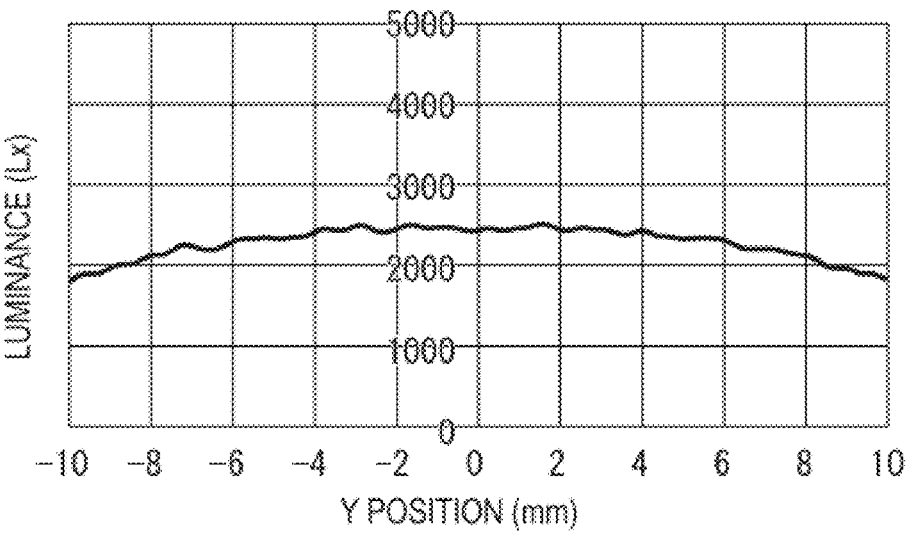 |
| Cm VALUE | 0.016 |

FIG.16

| SAMPLE | VERTEX ANGLE θ5 OF SECOND LIGHT DIFFUSION PORTION | Cm VALUE (-) |
|---|---|---|
| 1 | 70° | 0.025 |
| 2 | 80° | 0.023 |
| 3 | 90° | 0.016 |
| 4 | 100° | 0.041 |
| 5 | 110° | 0.052 |
| 6 | 140° | 0.094 |
| 7 | LENTICULAR LENS * | 0.076 |

FIG.18
| | EXAMPLE 2 |
|---|---|
| RIDGELINE DIRECTION IN SECOND SECTION | X-AXIS DIRECTION AND Y-AXIS DIRECTION (PRISM) |
| RIDGELINE DIRECTION IN THIRD SECTION | X-AXIS DIRECTION AND Y-AXIS DIRECTION (PRISM) |
| IMAGE | 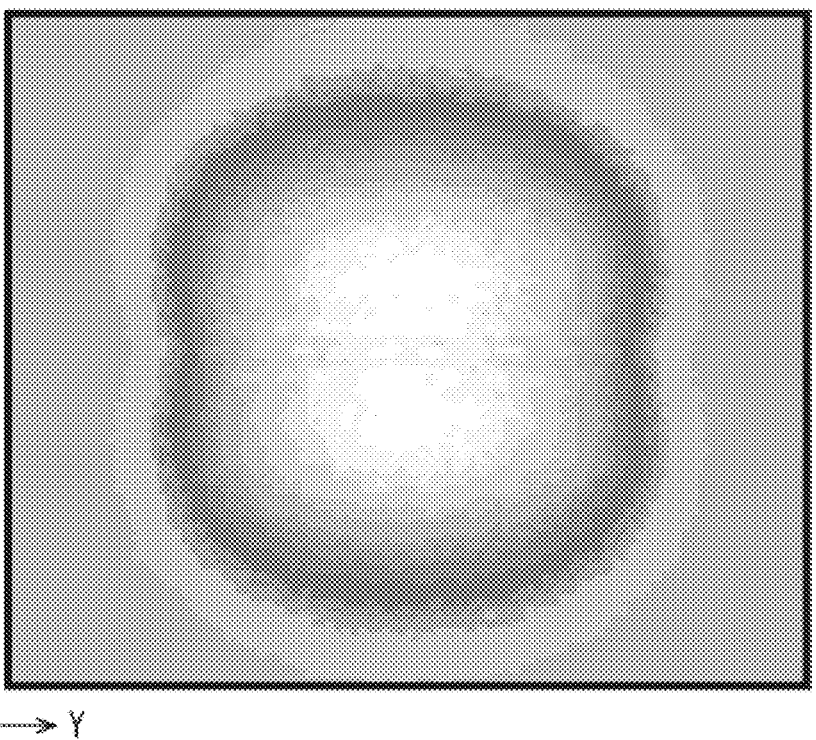 |
| GRAPH | 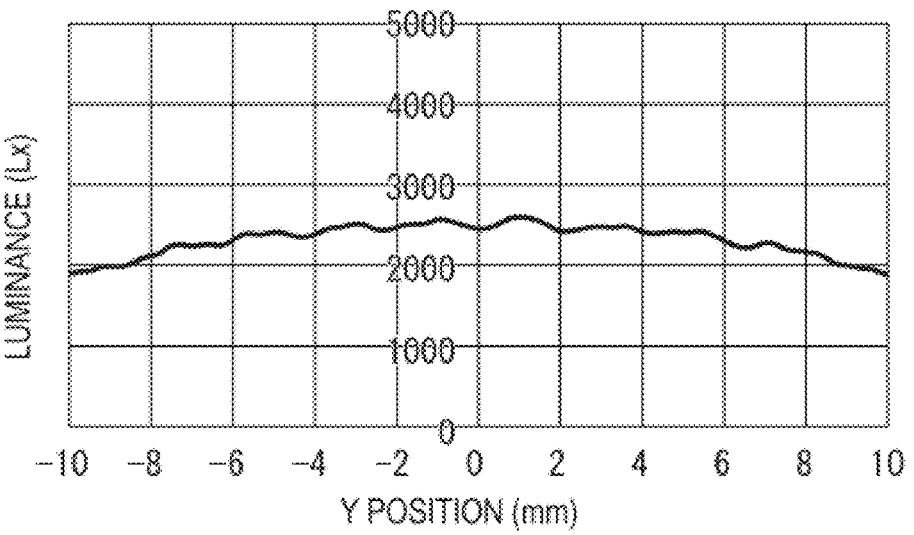 |
| Cm VALUE | 0.035 |

LIGHTING DEVICE AND DISPLAY DEVICE

CROSS REFERENCE TO RELATED APPLICATION

This application claims priority from U.S. Provisional Patent Application No. 63/196,492 filed on Jun. 3, 2021. The entire contents of the priority application are incorporated herein by reference.

TECHNICAL FIELD

The technology described herein relates to a lighting device and a display device.

BACKGROUND ART

A planar light source device is an example of backlights for liquid crystal display devices. The planar light source device includes a light guide plate including a depressed portion on an opposite side of a light exit surface, a first direction changing portion that is disposed in the depressed portion and changes a direction of travel of at least a part of light of the light emitting element, and a second direction changing portion that is provided higher than the light exit surface and changes a direction of travel of at least a part of light of the light emitting element.

According to the planar light source device, the light guide plate becomes further thinner and luminance unevenness is suppressed. However, if the number of light emitting elements installed in the backlight is reduced, the luminance unevenness is demanded to be further suppressed.

SUMMARY

The technology described herein was made in view of the above circumstances. An object is to reduce the number of light sources and suppress luminance unevenness.

A lighting device according to the technology described herein includes light sources arranged in one direction, a first light guide plate guiding light rays emitted by the light sources, and a second light guide plate disposed on the first light guide plate. The first light guide plate includes a first light entering surface opposed to the light sources, a first light exit surface that is on an opposite side from the first light entering surface and includes a first section extending along an arrangement direction in which the light sources are arranged and covering the light sources, and a first light diffusion portion included in the first section and adding a diffusion action to light rays travelling from the light sources toward the first section to be refracted and travel in a crossing direction crossing the arrangement direction. The second light guide plate guides light rays that exit through the first light exit surface and includes a second light entering surface opposed to the first light guide plate, a second light exit surface that is on an opposite side from the second light entering surface and includes a second section extending along the arrangement direction and covering the first section, and a second light diffusion portion included in the second section. The second light diffusion portion adds a diffusion action to light rays travelling from the second light entering surface toward the second section along a normal direction of the second light exit surface to be refracted and travel in the arrangement direction seen from the normal direction of the second light exit surface. The second light diffusion portion includes first lenses that include ridgelines extending in the crossing direction and inclined portions inclined at an angle from 35° to 55° inclusive with respect to the normal direction.

According to the technology described herein, luminance unevenness is suppressed with reducing the number of light sources.

BRIEF DESCRIPTION OF THE DRAWINGS

FIG. 14 is a table presenting experiment results of example 1.

FIG. 16 is a table presenting experiment results of test example 2.

FIG. 18 is a table presenting experiment results of example 2.

DETAILED DESCRIPTION

First Embodiment

Figure 1:
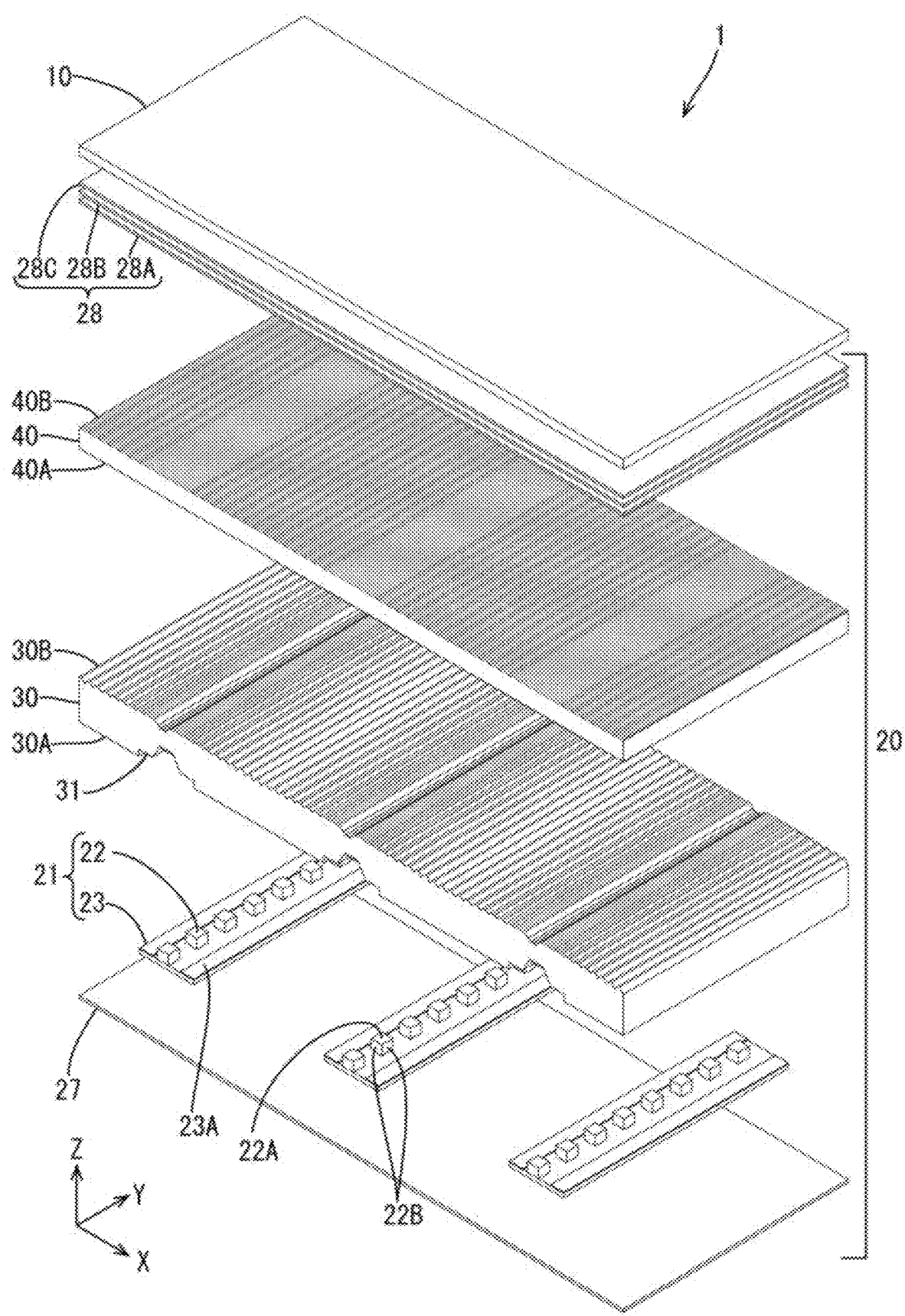
FIG. 1 is an exploded perspective view of a liquid crystal display device according to a first embodiment.

A backlight (a lighting device) 20 according to one embodiment and a liquid crystal display device (a display device) 1 including the backlight will be described with reference to FIGS. 1 to 10. X-axes, Y-axes, and Z-axes may be present in the drawings. The axes in each drawing indicate directions that correspond to directions indicated by the respective axes in other drawings. In this embodiment, an X-axis direction, a Y-axis direction, and a Z-axis direction are perpendicular to each other. A left side and a right side in FIGS. 2 to 4 and 6 correspond to a front side and a back side, respectively. Disclosures in the specifications of Japanese Patent Application No. 2019-175212 filed on Sep. 26, 2019 and U.S. patent application Ser. No. 17/018,601 filed on Sep. 11, 2020 are referred to for detailed configurations and designs of the components (a liquid crystal panel, an optical sheet, a first light guide plate, an LED unit, and a reflective sheet) of the backlight 20 and the liquid crystal display device 1 including the backlight 20 described herein except for a second light guide plate, which will be described later. The entire contents of the applications are incorporated herein by reference.

Figure 2:
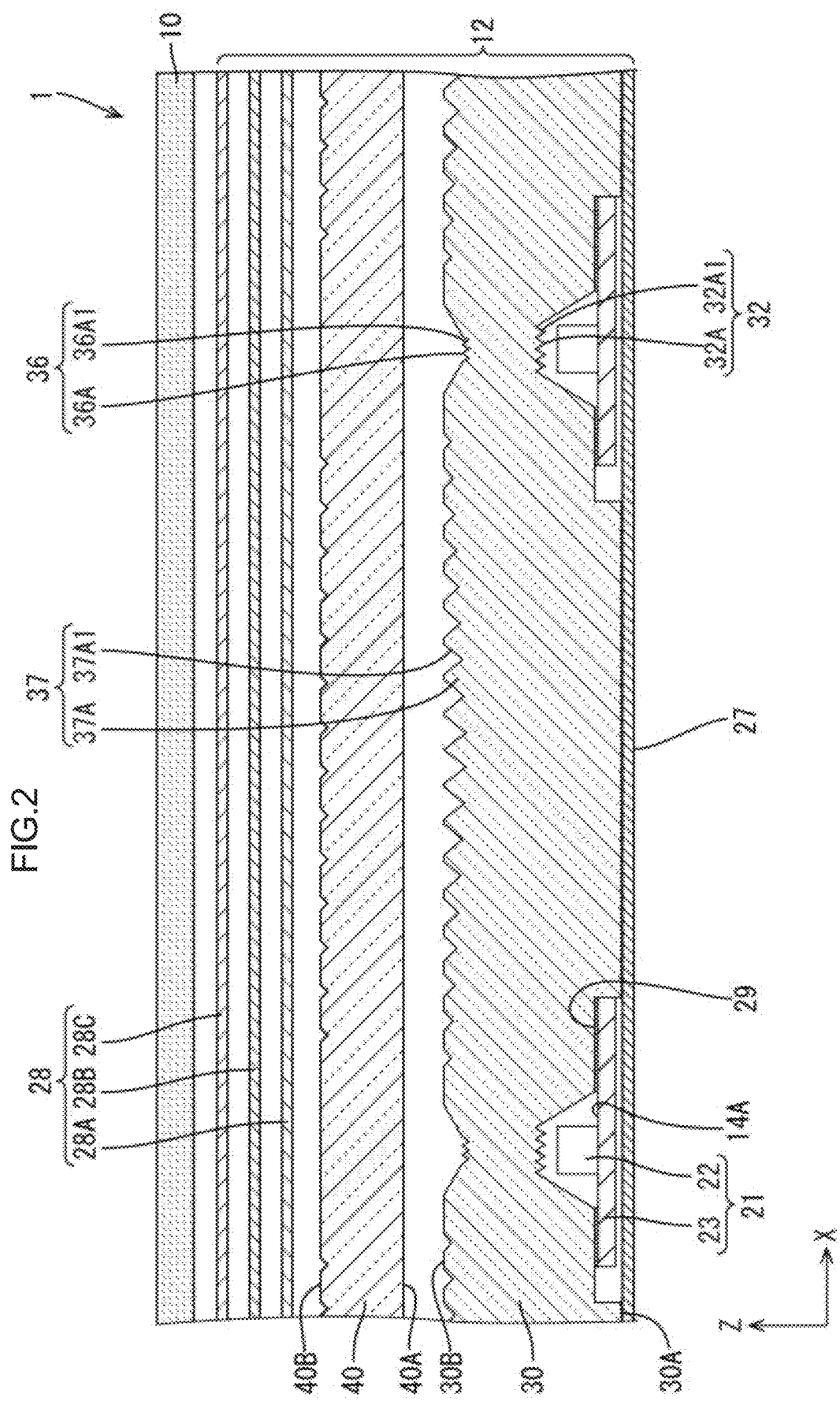
FIG. 2 is a cross-sectional view of the liquid crystal display device cut in an X-axis direction.

As illustrated in FIGS. 1 and 2, the liquid crystal display device 1 at least includes a liquid crystal panel (a display panel) 10 and the backlight 20. The liquid crystal panel 10 displays images. The backlight 20 is disposed behind the liquid crystal panel 10. The liquid crystal panel 10 includes a pair of glass substrates that are bonded to each other having a certain gap therebetween and liquid crystals that are sealed in the gap between the glass substrates. On an opposing surface of one of the glass substrates (an array substrate, an active matrix substrate, for example), source lines and gate lines that are perpendicular to each other, pixel electrodes that are disposed in sections defined by the lines, switching components (such as TFTs) that are connected to the pixel electrodes and to the source lines and the gate lines, and an alignment film are disposed. On an opposing surface of another one of the glass substrates (a CF substrate, for example), color filters, a black matrix that defines each of the color filters, and an alignment film are disposed. The color filters include red (R), green (G), and blue (B) color portions that are arranged in a predefined pattern. Polarizing plates are attached to non-opposing surfaces of the glass substrates.

The backlight 20 is disposed behind the liquid crystal panel 10 and is a light source that supplies light to the liquid crystal panel 10 for display. As illustrated in FIG. 1, the backlight 20 according to this embodiment has a laterally long rectangular shape as a whole. The long-side direction and the short-side direction correspond to the X-axis direction and the Y-axis direction, respectively, and the thickness direction corresponds to the Z-axis direction. As illustrated in FIGS. 1 and 2, the backlight 20 includes a reflective sheet 27, LED units 21, a first light guide plate 30, a second light guide plate 40, and an optical sheet component 28 in this order from the back side. Although FIGS. 1 and 2 are exploded views, the components are disposed on top of each other.

The backlight 20 includes the two light guide plates 30, 40. The light guide plates 30, 40 have high rigidity and are normally not warped due to their own weight and can keep their shapes. The light guide plates 30, 40 typically have a thickness (an average thickness) of 0.3 mm or greater; however, the thickness is not limited to the above value. The first light guide plate 30 and the second light guide plate 40 are disposed to cover LEDs 22 included in the LED units 21 from the front side (a light exit side). The light from the LEDs 22 exits the first light guide plate 30 and the second light guide plate 40 with travelling along the plate surfaces thereof. The reflective sheet 27 is disposed behind (on an opposite side from the light exit side) the LED units 21 and the light guide plates 30, 40 and reflects light, which exits the first light guide plate 30 toward the back side, toward the front side.

The optical sheet component 28 including optical sheets is disposed on the front side with respect to the light guide plates 30, 40. The optical sheet component 28 is for adjusting the light that is emitted by the LED units 21 and travels via the reflective sheet 27 and the light guide plates 30, 40 and the adjusted light exits the optical sheet component 28 toward the liquid crystal panel 10. The backlight 20 of this embodiment includes the LEDs 22 directly below the liquid crystal panel 10 and is a so-called direct-type backlight. The direct-type backlight 20 suppresses loss of light and has high light use efficiency compared to a so-called edge-type backlight that includes LEDs 22 on an edge of the liquid crystal panel 10. The backlight 20 may include a chassis in which the LED units 21 and the light guide plates 30, 40 are arranged and a frame that holds outer peripheral edge portions of the light guide plates 30, 40 and the optical sheet component 28. In this specification, a component referred to as a sheet has relatively lower rigidity than the light guide plate and can be warped by its own weight and is flexible. Hereinafter, each of the components of the backlight 20 will be described in detail.

As illustrated in FIG. 1, the LED unit 21 includes LEDs 22 that are arranged along the Y-axis direction and a LED board 23 that supports the LEDs 22. The LED board 23 may be rigid or flexible as long as the LED board 23 can stably support the LEDs 22. The LED board 23 has a mount surface 23A on which the LEDs 22 are mounted and wiring made of a metal film such as a copper foil is formed on the mount surface 23A and power is supplied to each of the LEDs 22 via the wiring. The LED boards 23 are disposed such that the mount surfaces 23A face the front side and are opposite a first light entering surface 30A (a back side surface) of the first light guide plate 30. The LED board 23 illustrated in FIG. 1 is a long plate and is disposed such that a longitudinal direction, a width direction (a short-side direction), and a thickness direction (a normal direction of the board) thereof correspond to the Y-axis direction, the X-axis direction, and the Z-axis direction, respectively. The LED board 23 of this embodiment has a length that is equal to a short-side dimension of the backlight 20 and a width that is quite smaller than a long-side dimension of the backlight 20.

The LED 22 is a bare chip light source that is not packaged with phosphor containing resin. The LED 22 emits light through all of outer surfaces except for a surface that is mounted on the LED board 23. The LED 22 of this embodiment has a block-shaped (square) outer shape and includes a light emitting top surface 22A that faces the front side and four light emission side surfaces 22B that face the lateral side. The light emitting top surface 22A is a surface that is parallel to the X-axis direction and the Y-axis direction (a normal direction of the surface corresponds to the Z-axis direction) and each of the light emission side surfaces 22B is parallel to at least the Z-axis direction. As illustrated in FIG. 1, the LEDs 22 are arranged on the mount surface 23A of the LED board 23 and are arranged at certain intervals in a straight line along the length direction (the Y-axis direction) of the LED board 23. The LEDs 22 arranged on the LED board 23 are configured as a LED row (a light source row). In the backlight 20, the arrangement direction in which the LEDs 22 of each LED row are arranged matches the Y-axis direction and three LED rows are arranged at intervals with respect to the X-axis direction. The LEDs 22 of this embodiment are blue LEDs that emit light of a single color of blue. The blue LED includes a compound semiconductor such as InGaN as light emitting material and is configured to emit light of a single color of blue in response to the application of a forward voltage. The blue light is visible light having a blue color wavelength range (about 400 nm to about 500 nm) having energy corresponding to a band gap.

The LEDs 22 in this embodiment are so-called mini LEDs. The mini LED 22 has a vertically-long shape having the Y-axis direction dimension that is greater than the X-axis direction dimension. For example, the Y-axis direction dimension is about from 0.3 mm to 0.6 mm (for example, 0.6 mm) and the X-axis direction dimension is about from 0.1 mm to 0.3 mm (for example, 0.3 mm); however, the specific dimensions are not limited to the above examples. An example of total radiant flux of such a mini LED (a blue LED, for example) is about 6.5 mW. With the configuration of the present technology, the LEDs 22 can be arranged on the mount surface 23A of the LED board 23 at intervals each of which is twice as that of the prior configuration. The interval between the LEDs 22 in the X-axis direction is same as the interval between the LED units 21 in the X-axis direction. For example, the interval between the LEDs 22 in the X-axis direction can be about from ten times to fifteen times as the interval between the LEDs 22 in the Y-axis direction. For example, in the backlight including a 15.6-inch display, an LED row includes 320 LEDs arranged at each interval of 24.25 mm in the prior configuration; however, the LED row includes 160 LEDs arranged at each interval of 2.15 mm in the present technology. A whole display includes 2,560 LEDs in the prior configuration. In this embodiment, with the number of LEDs included in a whole display being reduced to 1,280, which is a half of the number in the prior configuration, the planar light emission properties similar to those of the prior configuration can be obtained.

The LED unit 21 or the LED units 21 having the above configuration may be included in the backlight 20. The backlight 20 illustrated in FIG. 1 includes three LED units 21. The LED units 21 are arranged at equal intervals in the long-side direction of the backlight 20. Specifically, one of the three LED units 21 is disposed in a middle section of the backlight 20 with respect to the long-side direction and other ones are disposed in the respective end sections with respect to the long-side direction. Each of the three LED units 21 emits light toward the two end sections of the backlight 20 with respect to the long-side direction (the X-axis direction). Therefore, a distance between the adjacent LED units 21 can be greater than a distance between each of the LED units 21 on the end sections with respect to the arrangement direction of the LED units 21 and the edge of the backlight 20. For example, the former distance is about double of the latter distance. As to the distance between each of the LED units 21 on the end sections and the LED unit 21 on the middle section, the distance between the centers of the respective LED rows with respect to the X-axis direction is about 20 mm. The distance between the center of the LED row of each of the LED units 21 on the end sections and each edge of the backlight 20 is about 10 mm. The specific distances are not limited to the above examples. The distance between the centers of the adjacent LEDs 22 with respect to the Y-axis direction is about 2 mm, which is twice as that of the prior configuration, and the distance between the centers of the adjacent LEDs 22 with respect to the X-axis direction is about 20 mm.

The reflective sheet 27 has high light reflectivity (for example, 90% or higher) with respect to the light emitted by the LEDs 22. The reflective sheet 27 reflects light, which is emitted by the LEDs 22 and exits the first light guide plate toward the back side, toward the front surface. As illustrated in FIG. 1, the reflective sheet 27 is disposed to cover a substantially entire area including the LED boards 23 and the first light guide plate 30 from the back side. A configuration of the reflective sheet 27 is not particularly limited and the reflective sheet 27 may be a sheet formed by including fillers such as titanium oxide and air bubbles as internal filling in synthetic resin such as polypropylene, polyethylene terephthalate, and other polyester or may have a multi-layered structure of the synthetic resin with a predefined thickness. The multi-layered structure is a structure including the multiple synthetic resin layers that are disposed on top of each other. The synthetic layers have different refractive indexes and each of the synthetic resin layers has a thickness of ¼ or ½ of the wavelength of the visible light. Such a multi-layered structure can exert highly efficient reflection properties without involving diffusion. One example of the reflective sheet 27 having such a structure is "ESR" (product name) produced by 3M Japan Limited and including polyester resin.

As illustrated in FIG. 1, the optical sheet component 28 includes sheets having plate surfaces parallel to the plate surfaces of the liquid crystal panel 10 and the light guide plates 30, 40. The optical sheet component 28 is disposed between the liquid crystal panel 10 and the second light guide plate 40 with respect to the Z-axis direction (a normal direction of the plate surface of the optical sheet component 28). Namely, the optical sheet component 28 is disposed at an exit of a light travel passage of the backlight 20. The optical sheet component 28 adds predetermined optical effects to the light emitted by the LEDs 22 and the light exits the optical sheet component 28 toward the liquid crystal panel 10. The optical sheet component 28 has a back-side plate surface, which is opposite the front-side plate surface of the second light guide plate 40, as a light entering surface through which the light enters and a front-side plate surface, which is opposite the liquid crystal panel 10, as a light exit surface through which the light exits. The optical sheet component 28 includes three sheets that are disposed on top of each other. The three sheets include a wavelength conversion sheet (a phosphor containing sheet) 28A, a first luminance improving sheet (a first prism sheet) 28B, and a second luminance improving sheet (a second prism sheet) 28C in this order from the back side (from the one closer to the LEDs 22). Configurations of the optical sheet component 28 will be described below.

The wavelength conversion sheet 28A is for changing the wavelength of blue light emitted by the LED unit 21 and change the blue light to white light. As illustrated in FIG. 1, the wavelength conversion sheet 28A is closest to the LED unit 21 (the LEDs 22) among the sheets of the optical sheet component 28. The wavelength conversion sheet 28A includes a wavelength conversion layer (a phosphor film) and a pair of protection layers (protection films) that sandwich and protect the wavelength conversion layer from the front and back sides. The wavelength conversion layer includes phosphors (a wavelength conversion substance) for changing the wavelength of light from the LED unit 21. The wavelength conversion layer includes phosphors that are excited by the blue light (primary light) from the LEDs 22 and emit secondary light. The phosphors include green phosphors that emit green light as the secondary light and red phosphors that emit red light as the secondary light. The green phosphors and the red phosphors are down conversion type (down shifting type) phosphors that emit light having the wavelength longer than the excitation wavelength. The green light is visible light having a wavelength range of green (from about 500 nm to about 570 nm) and the red light is visible light having a wavelength range of red (from about 600 nm to about 780 nm). Therefore, some of the blue light rays emitted by the LEDs are converted into green light and red light through wavelength conversion by the green phosphors and the red phosphors included in the wavelength conversion sheet 28A. The green light and the red light (the secondary light) that are obtained through the wavelength conversion and the blue light (the primary light) from the LEDs 22 are mixed and substantially white light exits the backlight 20.

Examples of the green phosphors and the red phosphors included in the wavelength conversion layer include aluminum nitride-based phosphors represented by a general formula of $Si_{6-z}Al_zO_zN_{8-z}$:Eu (satisfying $0<Z<6$) and a general formula of (Sr,Ca)AlSiN$_3$:Eu, sulfide-based phosphors represented by a general formula of CaS:Eu, fluoride-based phosphors represented by a general formula of K$_2$SiF$_6$:Mn, and quantum dot phosphors represented by ZnSe and InP. Quantum dot phosphors that do not include cadmium are preferably used as the phosphors. The quantum dot phosphors include semiconductor nanocrystals (e.g., diameters in a range from 2 nm to 10 nm) that tightly confine electrons, electron holes, or excitons to have discrete energy levels. With the quantum size effects, a peak wavelength of emitting light (a color of emitting light) with optical luminance is freely selectable by changing the dot size. The emission light of the quantum dot phosphors has a steep peak in the light emission spectrum and the full width half max (FWHM) thereof is very small. Therefore, the emission light of the quantum dot phosphors has quite high color purity and large gamut in the liquid crystal display device 1. The pair of protection layers that sandwich the wavelength conversion layer are substantially transparent films made of synthetic resin and have good moisture-proof properties.

The first luminance improving sheet 28B and the second luminance improving sheet 28C are for collecting light from the LEDs 22, which are the light source, the reflective sheet 27, and the light guide plates 30, 40 toward a user who is on the front side of the liquid crystal display device 1 and improving luminance when the user sees the liquid crystal display device 1 from the front. Each of the first luminance improving sheet 28B and the second luminance improving sheet 28C includes a substantially transparent base sheet and unit prisms (for example, triangular prisms). The transparent base sheet is made of synthetic resin such as polyester. The unit prisms are made of acrylic resin having higher refractive index and are arranged on the surface of the base sheet in form of a prism pattern. With the combination of refraction and reflection obtained by such a prism pattern, each of the first luminance improving sheet 28B and the second luminance improving sheet 28C adds a predefined light collecting effect to the light that has entered the sheet selectively with respect to the arrangement direction in which the unit prisms are arranged. The light from the back side can be collected toward the front side. With the arrangement directions of the unit prisms of the first luminance improving sheet 28B and the unit prisms of the second luminance improving sheet 28C being perpendicular to each other, the light collecting effect with respect to the X-axis direction and the Y-axis direction can be added and the light from the back side can be collected toward the front side more effectively. The unit prism preferably has a vertex angle of about 90 degrees. As illustrated in FIG. 1, the first luminance improving sheet 28B and the second luminance improving sheet 28C are disposed between the liquid crystal panel 10 and the wavelength conversion sheet 28A.

The first light guide plate 30 is for guiding the light emitted by the LED unit 21 along the plate surface thereof. The first light guide plate of this embodiment particularly has a configuration for guiding the light emitted by the LED unit 21 effectively in the X-axis direction. More specifically, the first light guide plate 30 is made of synthetic resin material (acrylic resin such as PMMA and polycarbonate) that has a refractive index greatly higher than that of air and is substantially transparent. The first light guide plate 30 has a substantially plate shape and plate surfaces that are parallel to the plate surface of the liquid crystal panel 10. The first light guide plate 30 is disposed such that the long-side direction and the short-side direction of the plate surface correspond to the X-axis direction and the Y-axis direction, respectively, and the thickness direction corresponds to the Z-axis direction. As illustrated in FIG. 1 and other drawings, the first light guide plate 30 has a first light entering surface 30A (a back side surface) that is opposite the LED units 21 and a first light exit surface 30B (a front side surface) that is an opposite surface from the first light entering surface 30A. The first light exit surface 30B is overlapped with the second light guide plate 40 with being opposite the second light guide plate 40, which will be described later. The light rays emitted by the LEDs 22 enter the first light guide plate 30 through the first light entering surface 30A and most of the light rays travel within the first light guide plate 30 in a direction along the plate surface and directed toward the first light exit surface 30B (the front side) and exit the first light guide plate 30 through the first light exit surface 30B. In the following, details of the configuration of the first light guide plate 30 will be described. All of the components of the first light guide plate 30 described below are integrally formed with injection molding or compression molding.

As illustrated in FIGS. 1 and 2, the first light guide plate 30 includes light source housing recesses 31 for housing the respective LED units 21. The light source housing recesses 31 are formed by recessing portions of the first light entering surface 30A. The light source housing recesses 31 of this embodiment extend along the Y-axis direction of the first light guide plate 30. The light source housing recess 31 of this embodiment includes a first housing section 31A in which the LEDs 22 of the LED unit 21 are disposed and a second housing section 31B in which the LED board 23 of the LED unit 21 is disposed. The second housing section 31B is wider than the first housing section 31A. The second housing section 31B has a shape that extends from two edges of the first housing section 31A in the X-axis direction to be wider on the first light entering surface 30A. The LED board 23 is arranged in the second housing section 31B with the LEDs 22 facing the front side. Accordingly, the LEDs 22 that are included in the LED row are collectively arranged in the first housing section 31A and the LED units 21 are disposed in the respective light source housing recesses 31.

The light source housing recesses 31 are formed in the first light entering surface 30A at the positions corresponding to the respective LED units 21 and the LEDs 22 with respect to the X-axis direction such that the LED units 21 are arranged at equal intervals in the X-axis direction. In this embodiment, the first light entering surface 30A of the first light guide plate 30 includes non-forming portions having no light source housing recesses 31 and the non-forming portions have flat surfaces.

Figure 3:
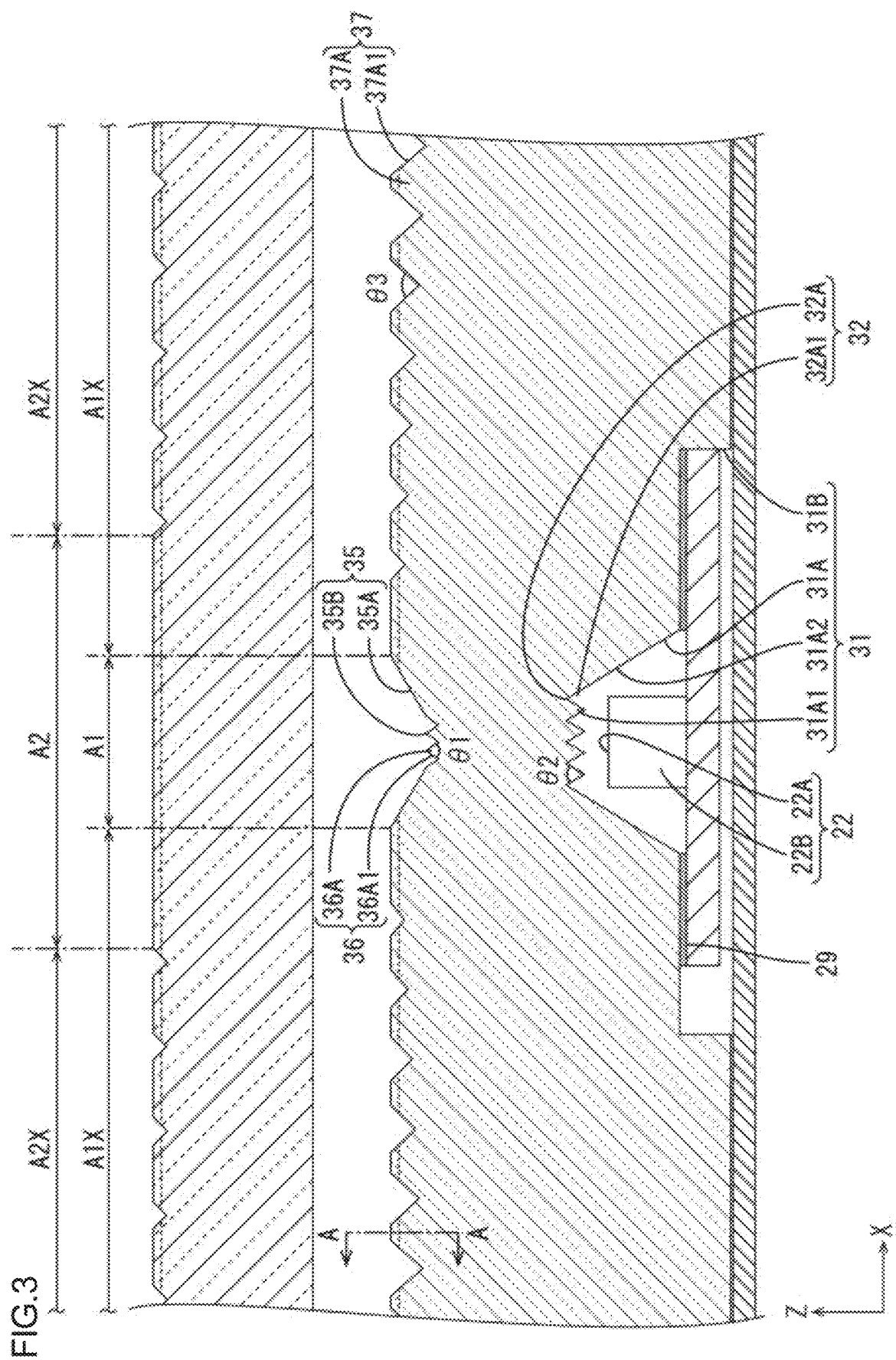
FIG. 3 is a magnified view of a portion of FIG. 2.
Figure 4:
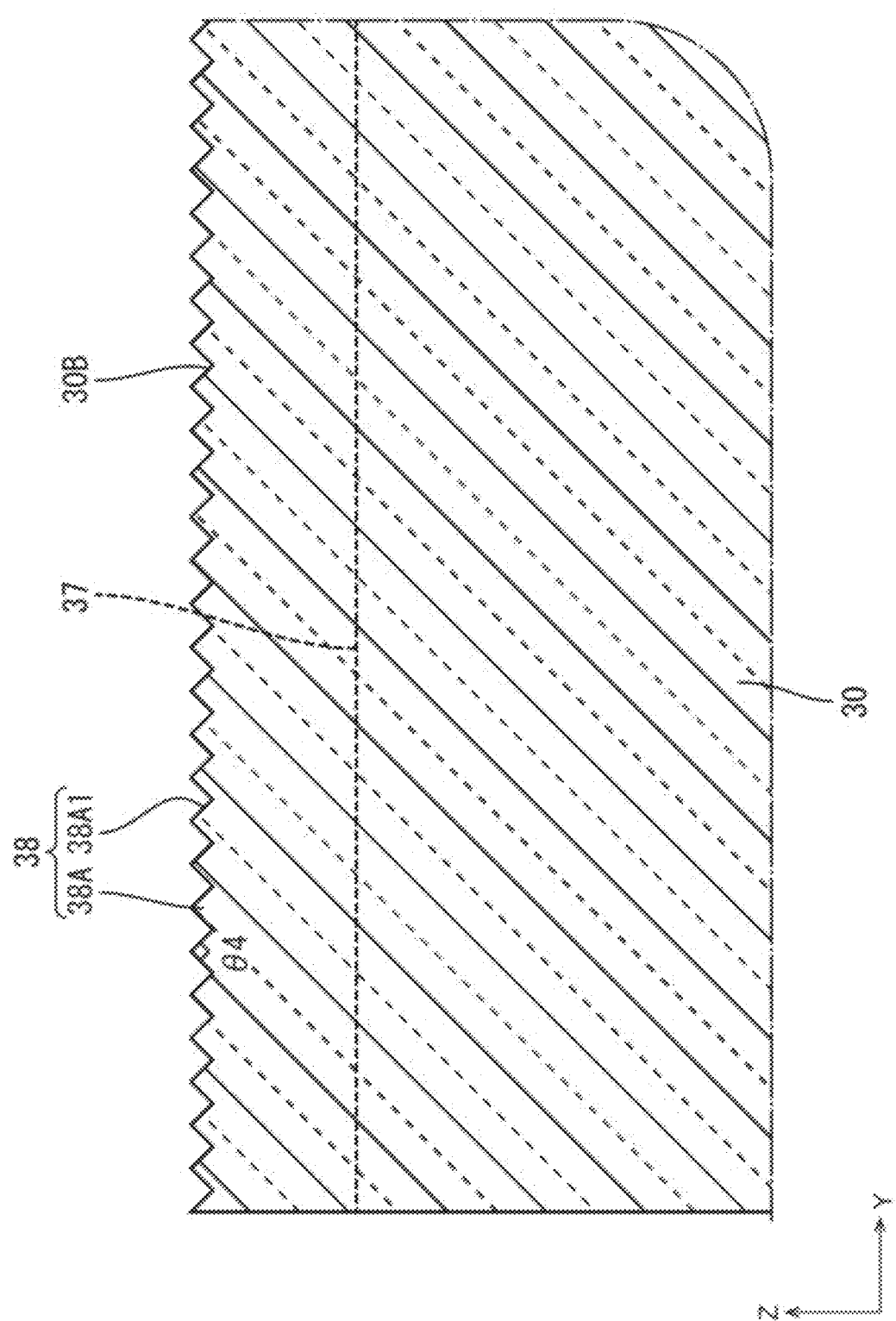
FIG. 4 is a cross-sectional view taken along line A-A in FIG. 3.

As illustrated in FIG. 3 and other drawings, in the light source housing recess 31, the X-axis dimension of the second housing section 31B is greater than that of the LED board 23. A double-sided adhesive tape 29 is attached to a surface of the second housing section 31B facing the back side. The double-sided adhesive tape 29 includes a base member having adhesive layers on two surfaces thereof and one of the two surfaces is attached to the back side surface of the second housing section 31B and the other one of the two surfaces is attached to the front plate surface of the LED board 23. Accordingly, the LED units 21 are fixed to the first light guide plate 30. The X-axis dimension of the first housing section 31A is effectively greater than that of the LED 22. The LEDs 22 are easily disposed in the first housing section 31A when the LED unit 21 is mounted on the first light guide plate 30. The inner surface of the first housing section 31A is opposite the LEDs 22 and is a light entering section through which the light emitted by the LEDs 22 directly enters the first light guide plate 30.

More specifically, the first housing section 31A is recessed toward the front side from the first light entering surface 30A and includes a light entering top portion 31A1 that is opposite the light emitting top surface 22A of each LED 22 and light entering sloped surfaces 31A2 that are opposite the light emission side surfaces 22B of each LED 22. The light entering sloped surfaces 31A2 are on two edge sides of the light entering top portion 31A1 with respect to the X-axis direction and connect the light entering top portion 31A1 and the first light entering surface 30A. The two light entering sloped surfaces 31A2 are symmetrically arranged with sandwiching the light entering top portion 31A1. The light entering top portion 31A1 and the light entering sloped surfaces 31A2 extend in the Y-axis direction over an entire length of the light source housing recess 31 and are configured as the light entering section. The light entering sloped surfaces 31A2 are sloped with respect to the X-axis direction and the Z-axis direction so as to be farther away from the first light exit surface 30B in the Z-axis direction as they extend away from the light entering top portion 31A1 in the X-axis direction. The light entering top portion 31A1 cross the light entering sloped surfaces 31A2. With the configuration of the two light entering sloped surfaces 31A2, the X-axis dimension of the first housing section 31A is reduced as the light entering sloped surfaces 31A2 extends closer to the light exit surface 30B in the Z-axis direction. With the light entering sloped surfaces 31A2 having such a configuration, the light that has entered the first light guide plate 30 can be angled with respect to the Z-axis direction to travel toward the light exit surface 30B. Furthermore, with the light entering sloped surfaces 31A2 that are sloped as described before, an object can be easily removed from a die when producing the first light guide plate 30 with injection molding or injection compression molding. The X-axis dimension of the light entering top portion 31A1 may be slightly greater than (for example, about 1.1 to two times as) that of the LED 22 so as to cover the LEDs 22 with respect to the X-axis direction. Accordingly, the light entering top portion 31A1 can directly receive light that is emitted by the LED 22 through the light emitting top surface 22A.

As illustrated in FIG. 3 and other drawings, the light entering top portion 31A1 of the first housing section 31A includes a light entering prism portion 32. The light entering prism portion 32 adds the diffusion action to the light that is emitted by the LEDs 22 and enters the light entering top portion 31A1 to be refracted and travel in a direction crossing the arrangement direction in which the LEDs 22 are arranged. The light entering prism portion 32 includes light entering unit prisms 32A that extend over an entire length of the first housing section 31A along the Y-axis direction and are arranged in the X-axis direction. The light entering unit prism 32A is a so-called prism type lens. The light entering unit prisms 32A of this embodiment protrude toward the back side in the light entering top portion 31A1 and are protrusion type prisms. The light entering unit prism 32A has a substantially triangular cross-sectional shape (a substantially mountain shape) cut along the X-axis direction and the ridgeline of the light entering unit prism 32A extends linearly along the Y-axis direction. The cross-sectional shape of the light entering unit prism 32A may be any triangular shape such as an isosceles triangle and a right triangle. The cross-sectional shape of the light entering unit prism 32A is preferably constant in the longitudinal direction (the Y-axis direction) over the entire length of the light entering unit prism 32A. The light entering unit prism 32A of this embodiment has an isosceles triangular cross-sectional shape and includes a pair of sloped surfaces 32A1. The configuration of the light entering unit prism 32A is not limited to this configuration. Each of the sloped surfaces 32A1 is inclined at an angle of from 30° to 60° inclusive with respect to the normal direction of the first light exit surface 30B. The vertex angle $\theta 2$ between the pair of sloped surfaces 32A1 is preferably 60° or greater or 75° or greater and is 120° or smaller or 85° or smaller, and may be 80°, for example.

The light entering unit prisms 32A having the same shape are arranged continuously in the X-axis direction. With the light entering unit prisms 32A being arranged continuously, the light entering prism portion 32 has a cross-sectional shape of a saw blade shape (a zig-zag shape) as illustrated in FIG. 3 and other drawings. With such a configuration, the light that is emitted by the LEDs 22 and enters through the light entering top portion 31A1 of the first housing section 31A can be spread in the X-axis direction by the light entering unit prisms 32A of the light entering prism portion 32 and travel toward the first light exit surface 30B. Accordingly, a greater amount of the light rays can travel in a direction so as to be away from the LEDs 22 of the LED row along the X-axis direction. Particularly, since the light entering top portion 31A1 of the first housing section 31A is present directly above the LEDs 22 of the LED row, the light entering top portion 31A1 receives a large amount of light rays that are emitted by the LEDs 22 through the light emitting top surfaces 22A and travel along the Z-axis direction and have high light emission intensity. The diffusion action is added to the light rays having high light emission intensity by the light entering prism portion 32. Therefore, the portions of the first light exit surface 30B overlapping the LEDs 22 of the LED rows are less likely to be recognized as local bright portions (so-called hot spots). This preferably suppresses luminance unevenness. Furthermore, the light entering prism portion 32 is configured such that the vertex angle $\theta 2$ of each light entering unit prism 32A is in a range from 75° to 85° inclusive. Therefore, the light entering prism portion 32 can add the diffusion action to the light effectively and luminance unevenness is further preferably suppressed.

As illustrated in FIG. 3 and other drawings, the first light exit surface 30B of the first light guide plate 30 includes first sections A1 each of which covers the LEDs 22 and extends in a belt-like shape along the arrangement direction (the Y-axis direction) in which the LEDs 22 are arranged. First light diffusion portions 35 are provided in the first sections A1, respectively. The first light diffusion portions 35 extend in the Y-axis direction and at least a portion of the first light diffusion portion 35 overlaps the LEDs 22 included in the LED row. The first light diffusion portion 35 adds a diffusing action to the light emitted by the LEDs 22 and travelling toward the first section A1 to be refracted and change a travelling direction to a direction (the X-axis direction) crossing the Y-axis direction that is the arrangement direction of the LEDs 22. The light is likely to exit through the first section A1 of the first light exit surface 30B with excessive high luminance; however, according to the above configuration, light is less likely to exit with excessive high luminance through the first section A1. The light tends to exit through fourth sections AIX, which are sections of the first light exit surface 30B except for the first sections A1, with low luminance; however, the light is more likely to exit through the fourth sections AIX with the above configuration. Accordingly, the amount of light rays exiting through the first light exit surface 30B becomes uniform within a plane surface of the first light exit surface 30B and this suppresses luminance unevenness. Furthermore, when light is emitted by specified LEDs 22 of the LEDs 22 included in the LED row and light is not emitted by the rest of the LEDs 22, the first light diffusion portion 35 adds the above diffusing action only to the light emitted by the specified LEDs 22. Accordingly, the light is more likely to exit through the portions of the first light exit surface 30B near the LEDs 22 that emit light with respect to the Y-axis direction and the light is less likely to exit through the portions near the LEDs 22 that do not emit light. Accordingly, such a configuration is preferable in performing so-called local dimming control and high dynamic range (HDR) control.

The configuration of the first light diffusion portion 35 will be described in detail. As illustrated in FIG. 3 and other drawings, the first light diffusion portion 35 is formed by forming sloped surfaces on portions of the first light exit surface 30B overlapping the LEDs 22 included in the LED row. The first light diffusion portion 35 includes a bottom section 35B and a pair of light exit sloped surfaces 35A. The bottom section 35B is recessed toward the back side from the first light exit surface 30B. Each of the light exit sloped surfaces 35A connects the bottom section 35B and the first light exit surface 30B. The light exit sloped surfaces 35A are sloped obtusely with respect to the first light exit surface 30B. The light exit sloped surfaces 35A add the diffusing action to the light emitted by the LEDs 22 and travelling toward the first section A1 to be refracted and change the traveling direction to the direction (the X-axis direction) crossing the Y-axis direction that is the arrangement direction of the LEDs 22. With the first light diffusion portion 35 being recessed toward the back side from the first light exit surface 30B, a greater amount of the light rays can be diffused and directed in a direction so as to be away from the LEDs 22 in the X-axis direction compared to a configuration including the first light diffusion portion as a protrusion on the first light exit surface 30B. This preferably suppresses luminance unevenness. The two light exit sloped surfaces 35A are disposed symmetrically while sandwiching the bottom section 35B therebetween with respect to the X-axis direction. The X-axis dimension of the first light diffusion portion 35 becomes smaller as the first light exit sloped surfaces 35A extend closer to the LEDs 22 with respect to the Z-axis direction. The X-axis dimension of the first light diffusion portion 35 becomes greater as the first light exit sloped surfaces 35A extend closer to the first light exit surface 30B with respect to the Z-axis direction. The light exit sloped surfaces 35A and the bottom section 35B extend along the Y-axis direction over the entire length of the first light diffusion portion 35.

As illustrated in FIG. 3 and other drawings, the bottom section 35B of the first light diffusion portion 35 includes a first light diffusion prism portion 36. The first light diffusion prism portion 36 is for adding the diffusion action to the light emitted by the LEDs 22 and entering the first section A1 to be refracted and travel in the direction crossing the arrangement direction of the LEDs 22. The first light diffusion prism portion 36 includes first light diffusion unit prisms 36A (a prism portion) that extend along the Y-axis direction over the entire length of the first light diffusion portion 35 and are arranged in the X-axis direction. The first light diffusion unit prism 36A is a so-called prism type lens and the first light diffusion unit prism 36A is a protrusion type prism and protrudes from the bottom section 35B toward the front side. The first light diffusion unit prism 36A has a substantially triangular (substantially mountain shape) cross sectional shape taken along the X-axis direction and the ridgeline thereof extends linearly along the Y-axis direction. The cross-sectional shape of the first light diffusion unit prism 36A may be any triangular shape such as an isosceles triangle and a right triangle. The cross-sectional shape of the first light diffusion unit prism 36A is preferably constant in the longitudinal direction (the Y-axis direction) over the entire length of the first light diffusion unit prism 36A. The first light diffusion unit prism 36A of this embodiment has an isosceles triangular cross-sectional shape and includes a pair of sloped surfaces 36A1. The configuration of the first light diffusion unit prism 36A is not limited to this configuration. Each of the sloped surfaces 36A1 is inclined at an angle of from 22.5° to 57.5° inclusive with respect to the normal direction of the first light exit surface 30B. The vertex angle θ1 between the pair of sloped surfaces 36A1 is preferably 45° or greater and is preferably 55° or greater and is 115° or smaller or 70° or smaller or 65° or smaller, and may be 60°, for example. The first light diffusion unit prisms 36A having the same shape are arranged continuously in the X-axis direction. With the first light diffusion unit prisms 36A being arranged continuously, the first light diffusion prism portion 36 has a cross-sectional shape of a saw blade shape (a zig-zag shape). With such a configuration, most of the light rays that are emitted by the LEDs 22 and reach the bottom section 35B of the first light diffusion portion 35 totally reflect off the sloped surfaces 36A1. Then, the light rays that are totally reflected are diffused to be directed in a direction so as to be away from the LEDs 22 along the X-axis direction and travel toward an opposite side from the first light exit surface 30B with respect to the Z-axis direction. Particularly, since the bottom section 35B of the first light diffusion portion 35 is present directly above the LEDs 22 of the LED row, the bottom section 35B receives a large amount of light rays that are emitted by the LEDs 22 through the light emitting top surfaces 22A and travel along the Z-axis direction and have high light emission intensity. The first light diffusion prism portion 36 can exert the diffusion action for the light rays having high light emission intensity. Therefore, the portions of the first light exit surface 30B overlapping the LEDs 22 are less likely to be recognized as local bright portions. This preferably suppresses occurrence of luminance unevenness. Furthermore, the first light diffusion prism portion 36 is configured such that the vertex angle θ1 of the first light diffusion unit prism 36A is in a range from 45° or greater and 115° or smaller. Therefore, the first light diffusion prism portion 36 can add the diffusion action to the light effectively and luminance unevenness is further preferably suppressed.

In the first light guide plate 30 described above, the X-axis dimension of the light entering top portion 31A1 may be greater than (for example, about 1.4 to two times as) that of the LEDs 22 to cover the LEDs 22 with respect to the X-axis direction. The X-axis dimension of the first light diffusion portion 35 may be greater than (for example, 1.5 to 2.5 times as) that of the light entering top portion 31A1 to cover the light entering top portion 31A1 with respect to the X-axis direction. The bottom section 35B may overlap the light entering top portion 31A1 with respect to the X-axis direction and may overlap the LEDs 22 with respect to the X-axis direction. The bottom section 35B may overlap at least centers of the LEDs 22 with respect to the X-axis direction and the X-axis dimension of the bottom section 35B is completely included in the width (the X-axis dimension) of the LEDs 22. According to such a configuration, the light entering top portion 31A1 directly receives the light that is emitted by the LEDs 22 through the light emitting top surfaces 22A and the bottom section 35B can receive the light with high intensity that is emitted from the middle of the LEDs 22 with respect to the X-axis direction via a short light passage. Such arrangement of the LEDs 22 can be achieved easily as follows. When assembling the LED unit 21, the LEDs 22 are arranged at a certain distance from the edge of the LED board 23 with respect to the width direction (from the right edge of the LED board 23 with respect to the X-axis direction in FIG. 3). The light entering top portion 31A1 and the bottom section 35B are formed in the first light guide plate 30 such that the centers of them with respect to the X-axis direction coincide with each other. The second housing section 31B is formed such that the edge of the second housing section 31B with respect to the X-axis direction (the right edge in FIG. 3) coincides with the edge (the right edge) of the LED board 23 when the LED unit 21 is disposed in the light source storing recess 31 such that the centers of the LEDs 22 with respect to the width direction (the X-axis direction) coincide with the center of the light entering top portion 31A1 with respect to the X-axis direction. With such a configuration, when the LED unit 21 is mounted on the first light guide plate 30, the LED unit 21 (the LED board 23) is fixed to the first light guide plate 30 (the second housing section 31B) with the right edge of the LED board 23 being in contact with the right edge of the second housing section 31B. Accordingly, the centers of the LEDs 22 with respect to the X-axis direction coincide with the centers of the light entering top portion 31A1 and the bottom section 35B with respect to the X-axis direction. Thus, the LED unit 21 can be disposed at a correct position easily and the light with relatively high intensity that is emitted by the LEDs 22 can be diffused along the X-axis direction. Luminance unevenness can be suppressed with high accuracy and an easy mounting method.

As illustrated in FIG. 3 and other drawings, the first light guide plate 30 includes a first light exit lens portion 37 (a fifth lens) in the fourth sections AIX on the first light exit surface 30B. The fourth sections AIX are the sections of the first light exit surface 30B other than the first sections A1 and do not overlap the LEDs 22 with respect to the normal direction of the first light exit surface 30B. The first light exit lens portion 37 is for adding the diffusion action to the light that travels from the first light entering surface 30A toward the first light exit surface 30B along the normal direction of the first light exit surface 30B to be refracted and travel in the direction crossing the arrangement direction of the LEDs 22. The first light exit lens portion 37 includes first light exit unit prisms 37A that extend along the Y-axis direction over the entire length of the fourth sections AIX and are arranged in the X-axis direction at intervals. The first light exit unit prism 37A is a so-called prism type lens. The first light exit unit prism 37A of this embodiment is a recessed type prism and recessed toward the back side from the first light exit surface 30B. The first light exit unit prism 37A has a substantially triangular cross-sectional shape (a substantially mountain shape or a V-shape) taken along the X-axis direction and the line extending along a recessed bottom (corresponding to the ridgeline of the protrusion type prism) extends linearly along the Y-axis direction. The cross-sectional shape of the first light exit unit prism 37A may be any triangular shape such as an isosceles triangle and a right triangle. The cross-sectional shape of the first light exit unit prism 37A is preferably constant in the longitudinal direction (the Y-axis direction) over the entire length of the first light exit unit prism 37A. The first light exit unit prism 37A of this embodiment has an isosceles triangular cross-sectional shape and includes a pair of sloped surfaces 37A1. The configuration of the first light exit unit prism 37A is not limited to this configuration. Each of the sloped surfaces 37A1 is inclined at an angle of from 40° to 50° inclusive (for example, 45°) with respect to the normal direction of the first light exit surface 30B. The vertex angle θ3 between the pair of sloped surfaces 37A1 is preferably 80° or greater and 100° or smaller and may be about 90°, for example.

The first light exit unit prisms 37A are arranged at intervals (of about 0.1 mm, for example) with respect to the X-axis direction in the fourth sections AIX. The first light exit unit prisms 37A may have the same vertex angle θ3 and may be arranged at the same intervals. The width of the bottom of the triangular cross-sectional shape, the length (area) and the depth of the sloped surface 37A1 measured from the bottom to the top may be varied according to the positions of the first light exit unit prisms 37A in the X-axis direction. Specifically, in the first light exit unit prisms 37A, the width of the bottom, the area and the depth of the sloped surface 37A1 tend to be decreased as the position of the first light exit unit prism 37A is closer to the first light diffusion portion 35 and they tend to be increased as the position is farther away from the first light diffusion portion 35. On the first light exit surface 30B of the first light guide plate 30, the width of the bottom of the first light exit unit prism 37A, the area and the depth of the sloped surface 37A1 are greatest at the position where the distance from the first light diffusion portion 35 in the X-axis direction is greatest (at the highest position on the sloped surface). Specifically, the first light exit unit prisms 37A are arranged at constant intervals of about 0.1 mm, for example, and the depth of the first light exit unit prisms 37A is varied (within the range from 0.015 mm to 0.055 mm inclusive). For example, the first light exit unit prism 37A that is closest to the LED 22 has the smallest depth, which is 0.015 mm, and the depth of the first light exit unit prism 37A is increased as the position of the first light exit unit prism 37A becomes farther away from the LED 22. The first light exit unit prism 37A that is about 8 mm away from the first light exit unit prism 37A closest to the LED 22 has the greatest depth, which is 0.055 mm.

According to such a configuration, among the light rays that have traveled within the first light guide plate 30 and reached the first light exit unit prisms 37A, light rays entering through the sloped surfaces 37A1 of the first light exit unit prisms 37A at an incident angle not greater than a critical angle exits the first light guide plate 30 and light rays entering through the sloped surfaces 37A1 at an incident angle greater than the critical angle are totally reflected by the sloped surfaces 37A1 and travel at least in a direction so as to be away from the first light exit surface 30B. The light rays that have totally reflected by the sloped surfaces 37A1 of the first light exit unit prisms 37A are reflected by the sloped surfaces or reflected by the reflective sheet 27 and travel toward the first light exit surface 30B again and exit through the sloped surfaces 37A1 of the first light exit unit prisms 37A eventually. The amount of exit light rays is proportional to the area of the sloped surface 37A1. The first light exit lens portion 37 is in the fourth section AIX that does not overlap the first light diffusion portion 35 and the LEDs 22 included in the LED row. The light is more likely to exit the first light guide plate 30 through the fourth section AIX of the first light exit surface 30B that is different from the first section A1. Furthermore, the first light exit unit prisms 37A are configured such that the area of the sloped surface 37A1 is increased as the positions of the first light exit unit prisms 37A are farther away from the first light diffusion portion 35 in the X-axis direction. According to such a configuration, light rays are less likely to exit the portion of the first light guide plate 30 near the first light diffusion portion 35 and light rays are more likely to exit the portion of the first light guide plate 30 farther away from the first light diffusion portion 35. Thus, luminance unevenness with respect to the X-axis direction is preferably suppressed.

Moreover, as illustrated in FIG. 3 and other drawings, in this embodiment, each of the intervals between the first light exit unit prisms 37A of the first light exit lens portion 37 is greater than the greatest width of the bottom of the triangular cross-sectional shape. According to such a configuration, the light rays that have been totally reflected by the sloped surfaces 37A1 of the first light exit unit prism 37A can travel in the X-axis direction much farther away from the LEDs 22 included in the LED row compared to a configuration in which the first light exit unit prism is formed as a protrusion type lens. Accordingly, the light is more likely to exit through the fourth section AIX of the first light exit surface 30B and luminance unevenness is suppressed more effectively. Particularly, with the vertex angle θ3 of the first light exit unit prism 37A being 90°, the recycling efficiency of light rays that have been totally reflected by the sloped surfaces 37A1 can be maximized and the configuration is excellent in view of the use efficiency of light.

As illustrated in FIG. 3 and other drawings, the first light guide plate 30 includes a second light exit lens portion 38 (a sixth lens) in the fourth sections AIX on the first light exit surface 30B. The second light exit lens portion 38 is for adding the diffusion action to the light that travels from the first light entering surface 30A toward the first light exit surface 30B along the normal direction of the first light exit surface 30B to be refracted and travel in the direction along the arrangement direction of the LEDs 22 (the Y-axis direction) so as to be away from the LEDs 22. The second light exit lens portion 38 includes second light exit unit prisms 38A in portions of the fourth sections AIX that do not include the first light exit lens portions 37. The second light exit unit prisms 38A extend along the X-axis direction and are continuously arranged in the Y-axis direction. The second light exit unit prisms 38A are so-called recessed type prisms and are recessed toward the back side from the first light exit surface 30B. The second light exit unit prism 38A has a substantially triangular cross-sectional shape (about mountain shape or a V-shape) taken along the Y-axis direction and the ridgeline thereof extends linearly along the X-axis direction. The cross-sectional shape of the second light exit unit prism 38A may be any triangular shape such as an isosceles triangle and a right triangle. The second light exit unit prism 38A of this embodiment has an isosceles triangular cross-sectional shape and includes a pair of sloped surfaces 38A1. The configuration of the second light exit unit prism 38A is not limited to this configuration. Each of the sloped surfaces 38A1 is inclined at an angle of from 30° to 70° inclusive (for example, 45°) with respect to the normal direction of the first light exit surface 30B. The vertex angle θ4 between the pair of sloped surfaces 38A1 is preferably 60° or greater or 75° or greater and 140° or smaller or 90° or smaller, and may be 90°, for example. The second light exit unit prisms 38A having the same shape may be arranged continuously in the Y-axis direction. With the second light exit unit prisms 38A being arranged continuously, the second light exit lens portion 38 may have a cross-sectional shape of a saw blade shape (a zig-zag shape). The cross-sectional shape of the second light exit unit prism 38A is preferably constant in the longitudinal direction (the X-axis direction) over the entire length of the second light exit unit prism 38A. Specifically, the intervals between the second light exit unit prisms 38A are constant and each of the intervals is about 0.013 mm and the depth of the second light exit unit prisms 38A is about 0.0065 mm and is constant.

According to such a configuration, most of the light rays that have traveled within the first light guide plate 30 and reached the second light exit unit prisms 38A are totally reflected by the sloped surfaces 38A1 of the second light exit unit prisms 38A and travel in the Y-axis direction so as to be farther away from the first light exit surface 30B. The light rays that have been totally reflected by the sloped surfaces 38A1 of the second light exit unit prisms 38A are reflected by the sloped surfaces or reflected by the reflective sheet 27 and are directed toward the first light exit surface 30B again. Some of the light rays directed toward the first light exit surface 30B again may exit through the sloped surfaces 38A1 of the second light exit unit prisms 38A or the sloped surfaces 37A1 of the first light exit unit prisms 37A. Thus, the light rays travelling within the first light guide plate 30 can be mixed with respect to the Y-axis direction and this suppresses luminance unevenness effectively. Moreover, in the second light exit lens portion 38, the depth of the second light exit unit prism 38A is smaller than the depth of the first light exit unit prism 37A. According to such a configuration, the sloped surface 37A1 of the first light exit unit prism 37A can have a larger area compared to a configuration in which the relations of the depth dimensions of the unit prisms are opposite from the above ones. With such a configuration, the amount of light rays that exit through the sloped surface 37A1 of the first light exit unit prism 37A can be increased and this increases the light diffusion efficiency.

The second light guide plate 40 is disposed on the front side of the first light guide plate 30 so as to overlap the first light guide plate 30. The second light guide plate 40 is for guiding the light, which exits through the first light exit surface 30B of the first light guide plate 30, along the plate surface. Particularly, the second light guide plate 40 of this embodiment is configured to guide effectively the light exiting the first light guide plate 30 with respect to the Y-axis direction. As illustrated in FIG. 1, the LEDs 22 are arranged at much greater intervals in the X-axis direction than the intervals with respect to the Y-axis direction. The light emitted by the LEDs 22 may be diffused in the X-axis direction at positions near the LEDs 22 such that the backlight 20 uniformly exits planar light effectively. However, if the light emitted by the LEDs 22 is diffused near the LEDs 22 only with respect to the X-axis direction and the intervals between the LEDs 22 are increased, the luminance unevenness becomes remarkable with respect to the Y-axis direction. The backlight 20 disclosed herein includes the second light guide plate 40 in addition to the first light guide plate 30. With such a configuration, even if the number of LEDs 20 arranged in the Y-axis direction is greatly reduced, the luminance unevenness with respect to the Y-axis direction can be effectively reduced. The second light guide plate 40 may be made of material similar to that of the first light guide plate 30 and may have the X-axis dimension, the Y-axis dimension, and the posture similar to those of the first light guide plate 30. The second light guide plate 40 has a substantially plate shape and includes a second light entering surface 40A and a second light exit surface 40B. The second light entering surface 40A (the back side surface) is opposite the first light guide plate 30. The second light exit surface 40B is an opposite side (the front side) surface of the second light entering surface 40A. The second light entering surface 40A is opposed to the first light exit surface 30B of the first light guide plate 30 and is disposed above the first light guide plate 30. The second light entering surface 40A of this embodiment is a flat surface. A detailed configuration of the second light entering surface 40A will be described below. The components of the second light guide plate 40 described below are integrally formed with injection molding or injection compression molding and have no joint interfaces.

As illustrated in FIG. 3 and other drawings, the second light exit surface 40B of the second light guide plate 40 includes second sections A2. The second sections A2 extend along the arrangement direction (the Y-axis direction) of the LEDs 22 in a belt-like shape and cover the first sections A1 of the first light guide plate 30, respectively. Second light diffusion portions 45 are included in the second sections A2, respectively. The second light diffusion portion 45 extends in the Y-axis direction and partially overlaps the LEDs 22 included in the LED row. The second light diffusion portion 45, which will be described later, adds a diffusing action to the light that travels from the second light entering surface 40A toward the second section A2 along the normal direction of the second light exit surface 40B to be refracted and travel in the direction along the arrangement direction of the LEDs 22 seen from the normal direction of the second light exit surface 40B. According to such a configuration, the light that is effectively diffused with respect to the X-axis direction by the first light guide plate 30 is further diffused with respect to the Y-axis direction. The light luminance tends to be relatively high in the portions of the second light exit surface 40B overlapping the LEDs 22. However, with the configuration of this embodiment, even if the number of the LEDs included in the LED unit 21 is reduced and the intervals between the LEDs 22 are increased, the distribution of light exit amount can be uniformed within the surface area of the second light exit surface 40B including the portions overlapping the LEDs 22 and having the tendency of increased light luminance. Accordingly, the luminance unevenness can be suppressed with reducing the number of LEDs 22.

Figure 5:
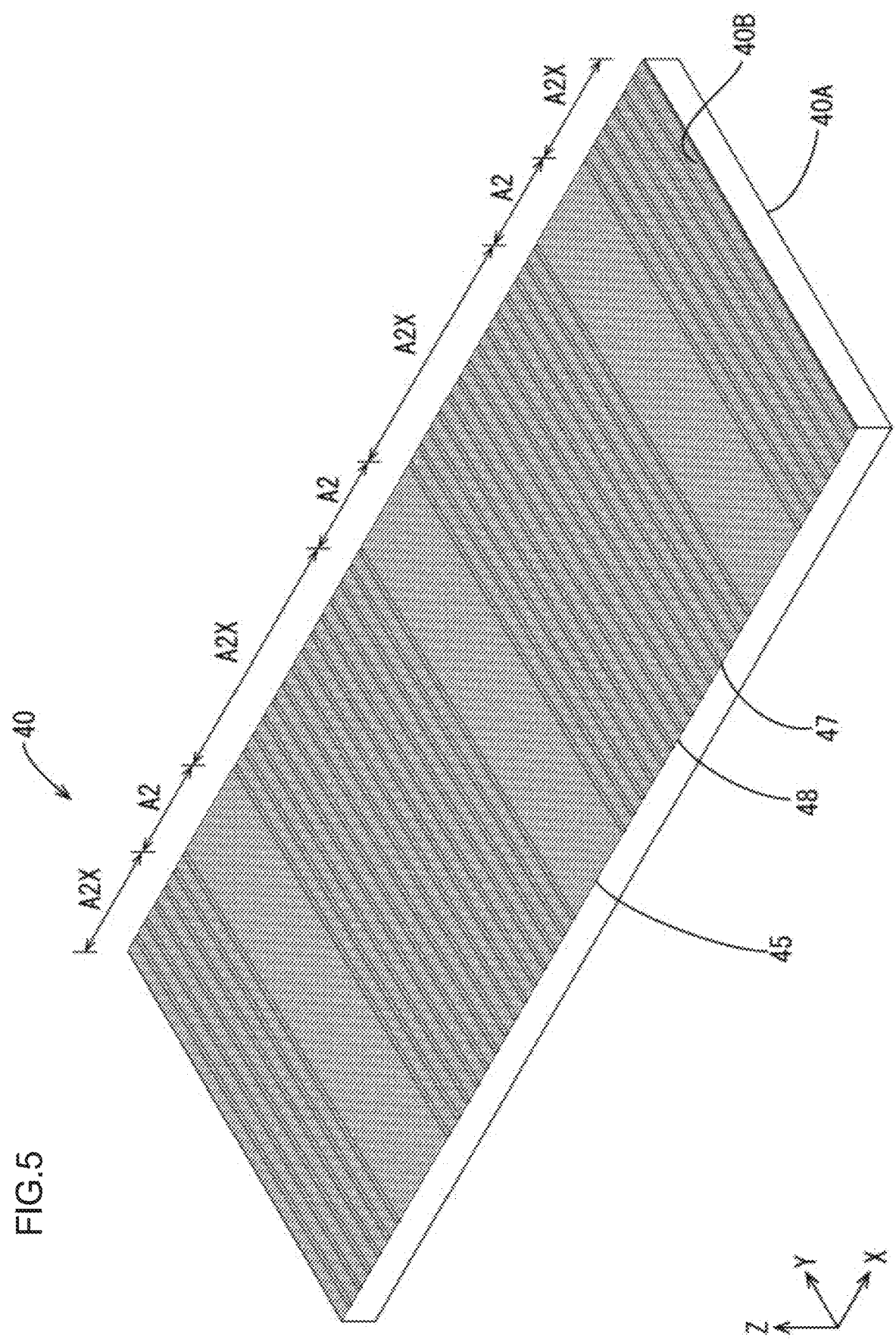
FIG. 5 is a perspective view of a second light guide plate included in the liquid crystal display device.

The configuration of the second light diffusion portion 45 will be described in detail. As illustrated in FIGS. 3, 5 and other drawings, the second light diffusion portions 45 are provided in the second sections A2 of the second light exit surface 40B, respectively. The second sections A2 cover the respective first sections A1 including the first light diffusion portions 35 with respect to the X-axis direction and the Y-axis direction. The second sections A2 extend over the entire length of the second light guide plate 40 with respect to the Y-axis direction. The second section A2 has a width that is effectively greater than (for example, 2.4 mm, five times to ten times as) the width of the LEDs 22 (for example, about 0.3 mm), which is a light source. The second sections A2 are arranged at equal intervals with respect to the X-axis direction corresponding to the LED units 21 and the first sections A1, respectively. According to this embodiment, three second sections A2 are arranged at equal intervals with respect to the X-axis direction. Portions of the second light exit surface 40B other than the second sections A2 are third sections A2X. Each of the second section A2 and the third section A2X that are adjacent to each other is defined by a third light exit lens portion 47, which will be described later.

Figure 6:
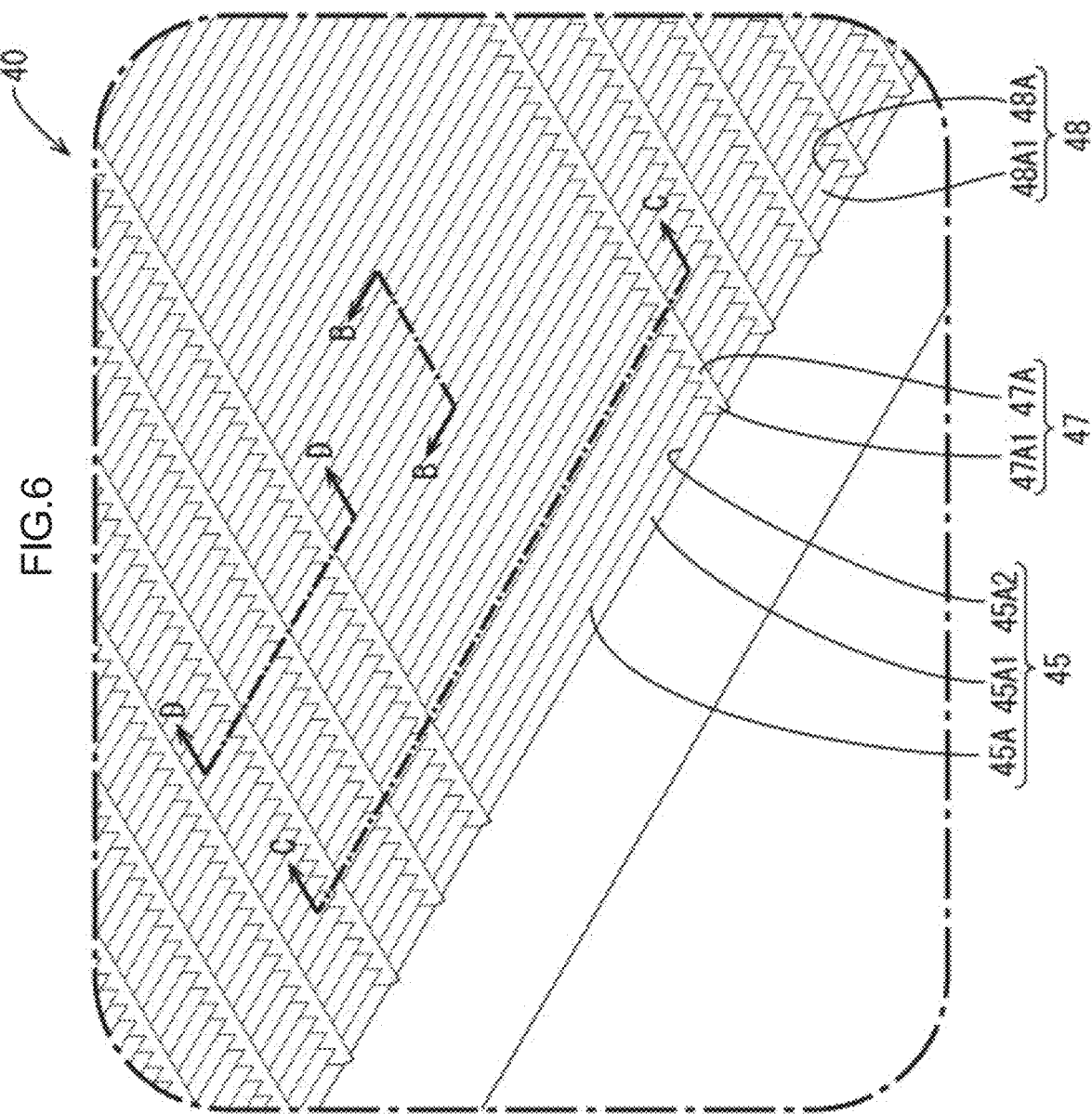
FIG. 6 is a magnified view of a portion of FIG. 5.
Figure 7:
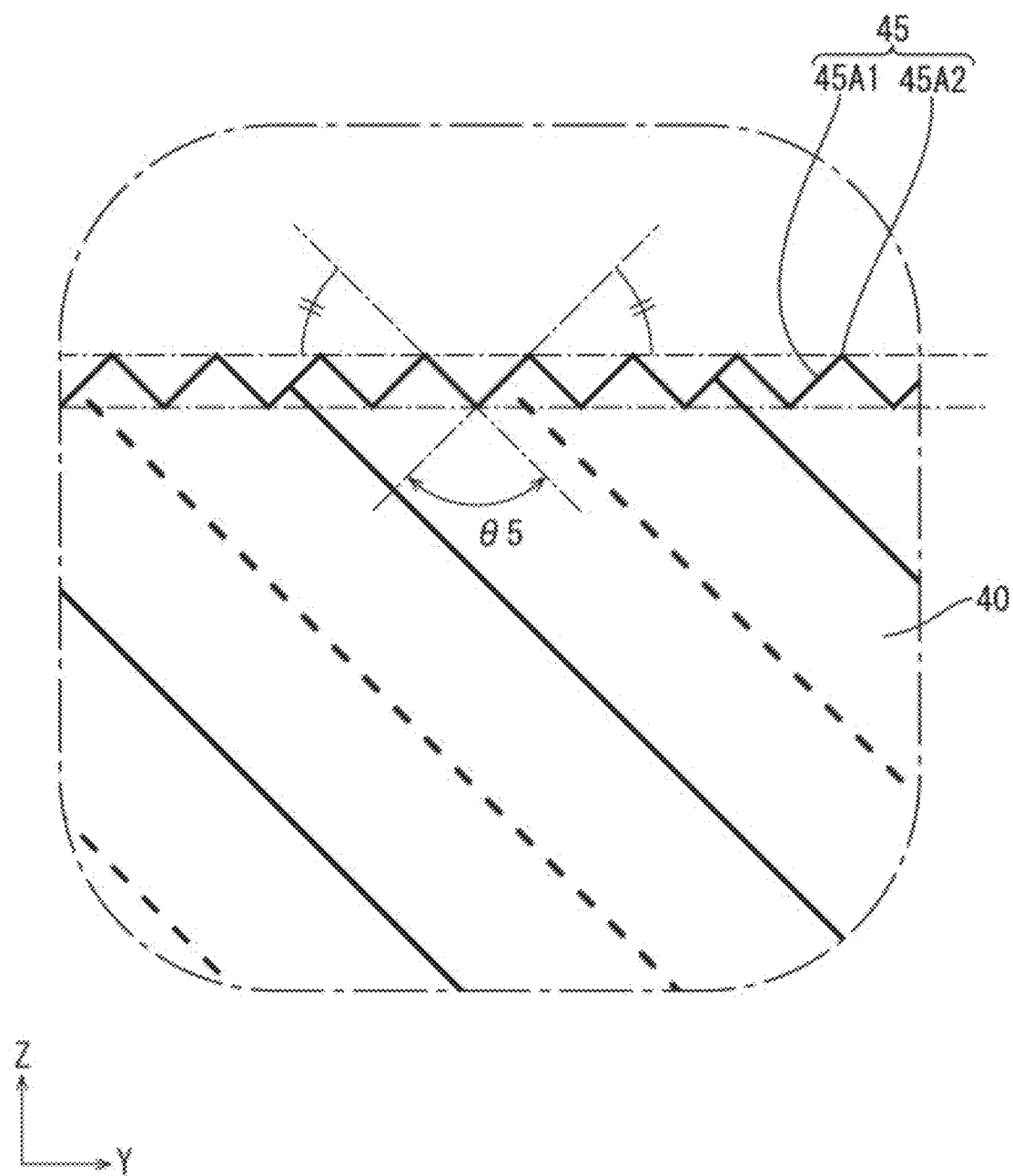
FIG. 7 is a cross-sectional view taken along line B-B in FIG. 6.

The second light diffusion portion 45 includes second light diffusion unit prisms 45A (corresponds to a first lens of the present technology) that extend along the X-axis direction over the entire length of the second section A2 and are arranged in the Y-axis direction. The second light diffusion unit prism 45A is a so-called prism type lens and the second light diffusion unit prism 45A according to this embodiment has a substantially triangular (substantially mountain shape or a V-shape) cross-sectional shape taken along the Y-axis direction and the ridgeline thereof extends linearly along the X-axis direction as illustrated in FIGS. 6, 7, and other drawings. In other words, the second light diffusion unit prism 45A is a prism portion having a triangular columnar shape. The cross-sectional shape of the second light diffusion unit prism 45A may be any triangular shape such as an isosceles triangle and a right triangle. The cross-sectional shape of the second light diffusion unit prism 45A is preferably constant in the longitudinal direction (the X-axis direction) over the entire length of the second light diffusion unit prism 45A. The second light diffusion unit prism 45A of this embodiment has an isosceles triangular cross-sectional shape and includes a pair of sloped surfaces 45A1 (a sloped portion) and a ridgeline 45A2 that is formed at a joint of the two sloped surfaces 45A1. The configuration of the second light diffusion unit prism 45A is not limited to this configuration. The ridgelines 45A2 and ridgelines of other lenses are on the same plane. The second light diffusion unit prism 45A is a recessed prism that is recessed toward the back side on the second light exit surface 40B. Each of the sloped surfaces 45A1 is inclined at an angle of from 35° to 55° inclusive (for example 45°) with respect to the normal direction of the second light exit surface 40B. The vertex angle θ5 between the pair of sloped surfaces 45A1 is preferably 70° or greater or 80° or greater and is 110° or smaller or 100° or smaller. The vertex angle θ5 may be preferably 90°, for example. With the second light diffusion unit prisms 45A having the same shape being arranged continuously in the Y-axis direction, the second light diffusion portion 45 has a cross-sectional shape of a saw blade shape (a zig-zag shape).

According to such a configuration, the light rays that have travelled within the second light guide plate 40 and reached the second light diffusion portion 45 are spread in the Y-axis direction by the second light diffusion unit prisms 45A of the second light diffusion portion 45 and travel toward the second light exit surface 40B. Accordingly, the light that is emitted by the LEDs 22 of the LED unit 21 can travel farther in the Y-axis direction. Particularly, since the second section A2 is directly above the LEDs 22 of the LED row, the second section A2 receives a large amount of light rays that are emitted by the LEDs 22 through the light emitting top surfaces 22A and travel along the Z-axis direction and have high light emission intensity. The LEDs 22 of the LED row are arranged away from each other with respect to the Y-axis direction. On the other hand, the light rays emitted by the LEDs 22 are less likely to reach the portions of the second light guide plate other than the overlapping portions overlapping the light emitting top surfaces 22A of the LEDs 22 as the portions of the second light guide plate become farther away from the LEDs 22 along the Y-axis direction. The portions of the second light guide plate other than the overlapping portions tend to have relatively low luminance. The second light diffusion portion 45 adds the diffusion action to the light to be retracted and travel in the Y-axis direction. Therefore, the portions of the second light exit surface 40B overlapping the LEDs 22 are less likely to be recognized as local bright portions (a so-called hot spot). This preferably suppresses luminance unevenness. Furthermore, such a configuration can provide the high diffusion action to the light and preferably suppress the luminance unevenness. The second light diffusion unit prisms 45A are away from each other at equal intervals in the Y-axis direction. The distance (an arrangement interval) between the vertexes of the triangular cross sections of the second light diffusion unit prisms 45A is preferably much smaller than the longitudinal (the Y-axis direction) dimension of the LED 22 and is about from ⅟10 to ⅟50 (for example, ⅟20 and about 0.03 mm) of the longitudinal dimension of the LED 22. The second light diffusion unit prisms 45A arranged along the Y-axis direction may have the same cross-sectional shape. For example, the width of the bottom of the triangular cross-sectional shape of the second light diffusion unit prisms 45A is preferably 0.03 mm and constant and the width measured from the bottom to the vertex is preferably 0.015 mm and constant.

Figure 8:
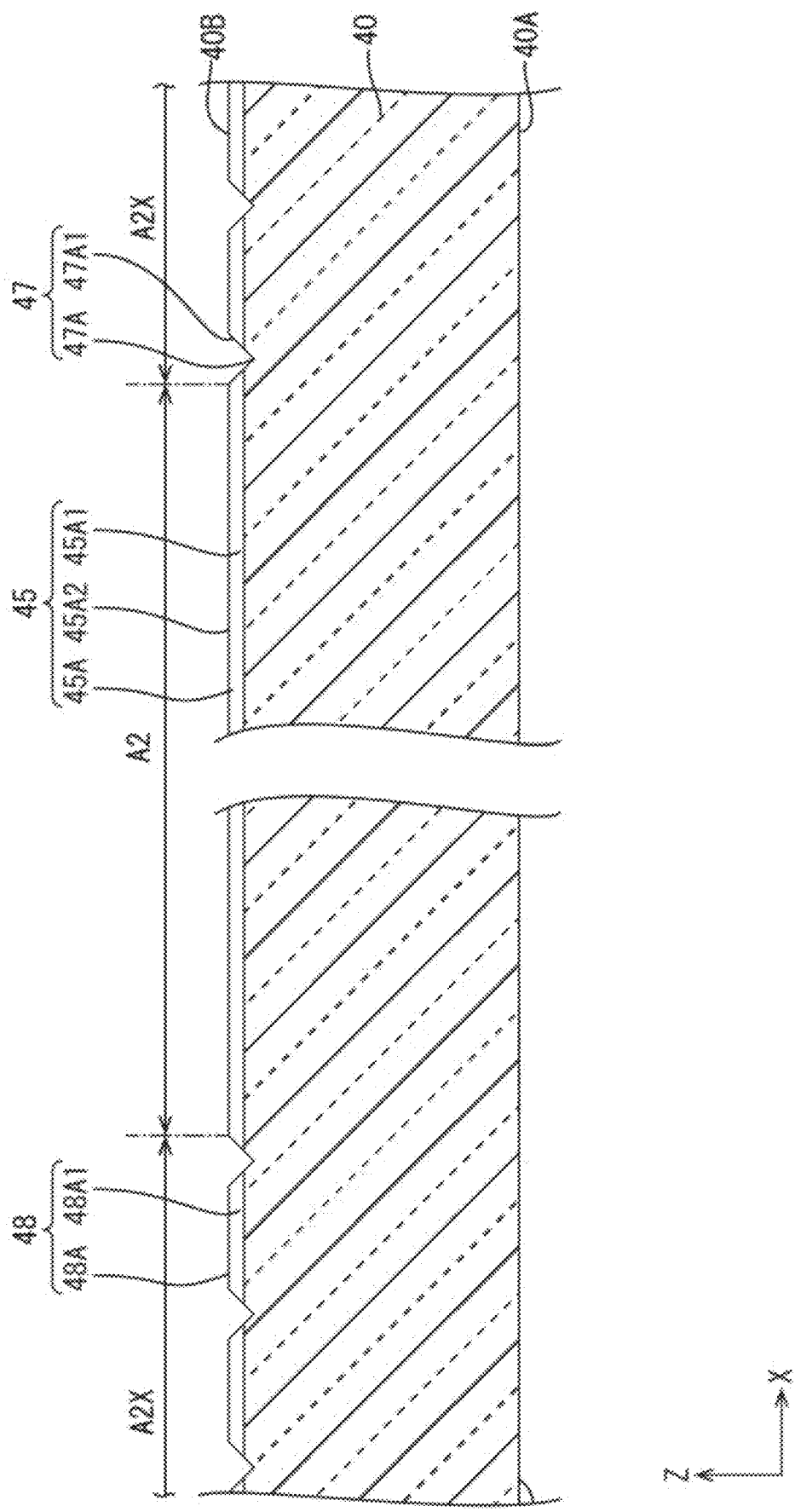
FIG. 8 is a cross-sectional view taken along line C-C in FIG. 6.
Figure 9:
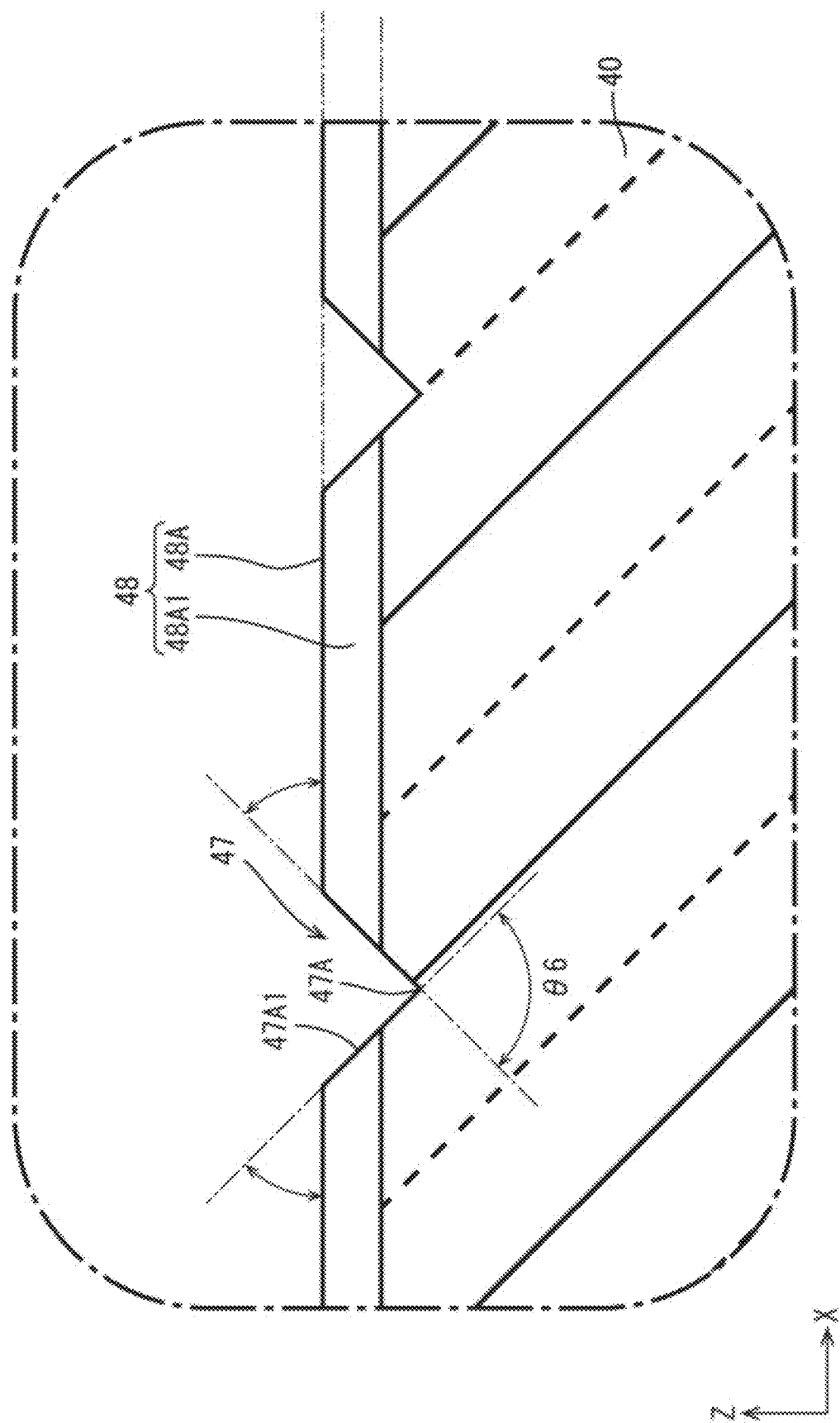
FIG. 9 is a cross-sectional view taken along line D-D in FIG. 6.
Figure 10:
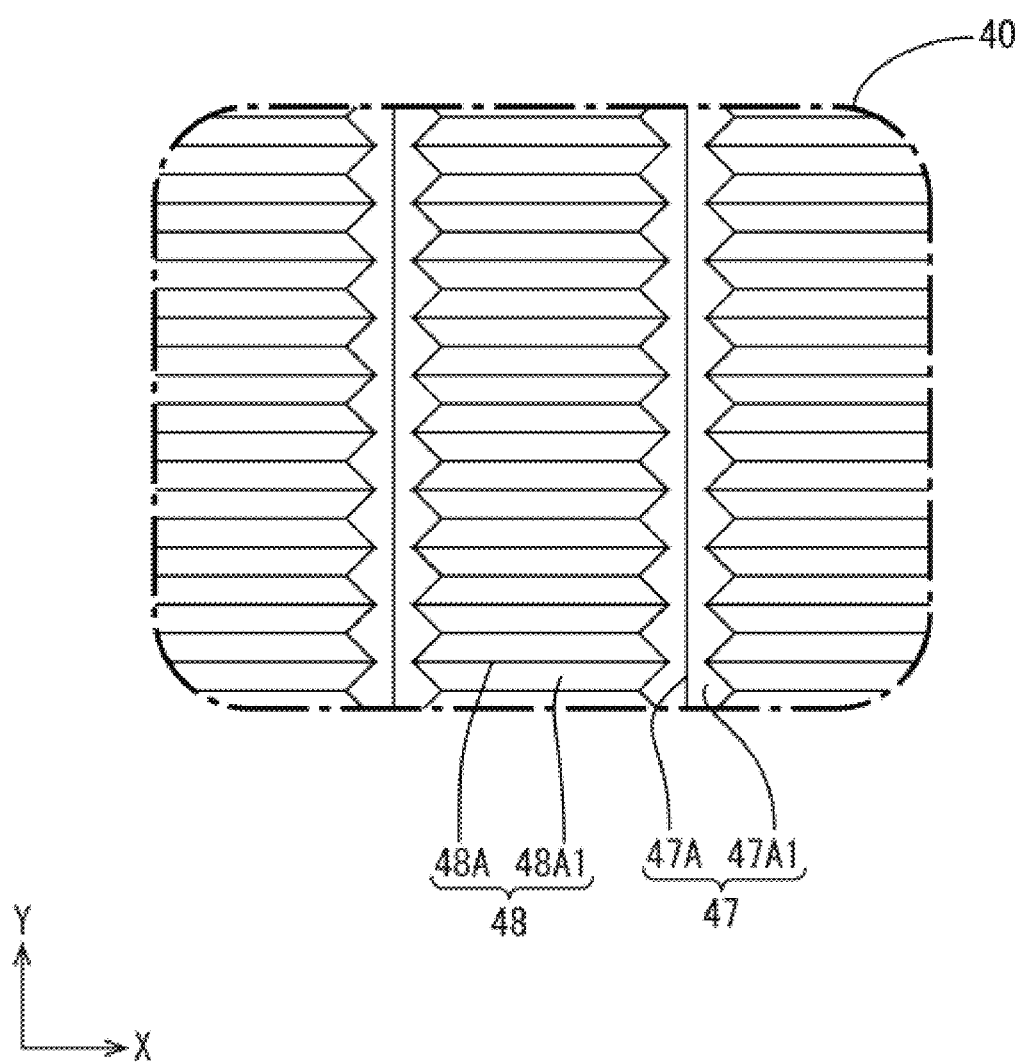
FIG. 10 is a plan view of a third section of the second light guide plate.

As illustrated in FIGS. 8, 9, and other drawings, the second light guide plate 40 includes a third light exit lens portions 47 in the third sections A2X on the second light exit surface 40B, respectively. The third sections A2X are the sections of the second light exit surface 40B other than the second sections A2. The third light exit lens portion 47 is for adding the diffusion action to the light that travels from the second light entering surface 40A toward the second light exit surface 40B along the normal direction of the second light exit surface 40B to be refracted and travel in the direction crossing the arrangement direction of the LEDs 22 (the X-axis direction in this embodiment). The third light exit lens portion 47 includes third light exit unit prisms 47A (a third lens) that extend along the Y-axis direction over the entire length of the third sections A2X and are arranged in the X-axis direction at intervals. As described previously, each of the second section A2 and the third section A2X is defined by the third light exit unit prism 47A that is adjacent to the second section A2. The third light exit unit prism 47A is a so-called prism type lens. The third light exit unit prism 47A of this embodiment is a recessed type prism and is recessed toward the back side in the third section A2X of the second light exit surface 40B. As illustrated in FIG. 9, the third light exit unit prism 47A has a substantially triangular cross-sectional shape (a substantially mountain shape or a V-shape) taken along the X-axis direction and the ridgeline thereof extends linearly along the Y-axis direction. The cross-sectional shape of the third light exit unit prism 47A is preferably constant in the longitudinal direction (the Y-axis direction) over the entire length of the third light exit unit prism 47A. The cross-sectional shape of the third light exit unit prism 47A may be any triangular shape such as an isosceles triangle and a right triangle. The third light exit unit prism 47A of this embodiment has an isosceles triangular cross-sectional shape and includes a pair of sloped surfaces 47A1. Each of the sloped surfaces 47A1 is inclined at an angle of from 40° to 50° inclusive (for example, 45°) with respect to the normal direction of the second light exit surface 40B. The vertex angle θ6 between the pair of sloped surfaces 47A1 is preferably 80° or greater and 100° or smaller and may be about 90°, for example. The third light exit unit prisms 47A are arranged at intervals (of about 0.1 mm, for example) with respect to the X-axis direction in the third sections A2X similar to the first light exit unit prisms 37A. The third light exit unit prisms 47A are at same intervals with respect to the X-axis direction and the distance (the arrangement interval) between the vertexes of the triangular cross sections of the third light exit unit prisms 47A is about 0.153 mm, for example. The third light exit unit prisms 47A arranged along the X-axis direction may have the same cross-sectional shape and may have the same vertex angle θ6 and the same arrangement interval. The width of the bottom of the triangular cross-sectional shape, the length (area) and the depth of the sloped surface 47A1 measured from the bottom to the top may be varied according to the position of each of the third light exit unit prisms 47A in the X-axis direction. For example, the width of the bottom surface of the triangular cross-sectional shape of the third light exit unit prisms 47A may be 0.05 mm and constant and the width measured from the bottom to the vertex may be 0.025 mm and constant. For another example, the triangular cross-sectional shape of the third light exit unit prisms 47A may be varied such that the depth is varied within the range from 0.015 mm to 0.055 mm inclusive similar to that of the first light exit unit prisms 37A of the first light guide plate 30. The width of the bottom surface and the depth of the triangular cross-sectional shape of the third light exit unit prism 47A may be relatively greater than those of the second light diffusion unit prism 45A.

According to such a configuration, among the light rays that have traveled within the second light guide plate 40 and reached the third light exit unit prisms 47A, light rays entering through the sloped surfaces 47A1 of the third light exit unit prisms 47A at an incident angle not greater than a critical angle exits the second light guide plate 40 and light rays entering through the sloped surfaces 47A1 at an incident angle greater than the critical angle are totally reflected by the sloped surfaces 47A1 and travel at least in a direction so as to be away from the second light exit surface 40B. The light rays that have been totally reflected by the sloped surfaces 47A1 are reflected by the second light entering surface 40A and travel toward the second light exit surface 40B again and exit through the sloped surfaces 47A1 of the third light exit unit prisms 47A eventually. The third light exit unit prisms 47A are in the third sections A2X and light rays are more likely to exit through the third sections A2X of the second light exit surface 40B of the second light guide plate 40. Thus, luminance unevenness with respect to the X-axis direction is preferably suppressed.

As illustrated in FIG. 6 and other drawings, the second light guide plate 40 includes fourth light exit lens portions 48 in the respective third sections A2X on the second light exit surface 40B. The fourth light exit lens portion 48 is for adding the diffusion action to the light that travels from the second light entering surface 40A toward the second light exit surface 40B along the normal direction of the second light exit surface 40B to be refracted and travel in the direction along the arrangement direction of the LEDs 22 (the Y-axis direction in this embodiment) so as to be away from the LEDs 22. The fourth light exit lens portion 48 includes fourth light exit unit prisms 48A (a second lens) in portions of the third sections A2X where no third light exit lens portions 47 are formed. The fourth light exit unit prisms 48A extend along the X-axis direction and are continuously arranged in the Y-axis direction. The fourth light exit unit prism 48A is a so-called prism type lens. The fourth light exit unit prism 48A of this embodiment is a recessed type prism and is recessed toward the back side from the second light exit surface 40B. The fourth light exit unit prism 48A has a substantially triangular cross-sectional shape (about mountain shape or a V-shape) taken along the Y-axis direction and the ridgeline thereof extends linearly along the X-axis direction. The cross-sectional shape of the fourth light exit unit prism 48A may be any triangular shape such as an isosceles triangle and a right triangle. The fourth light exit unit prism 48A preferably has the cross-sectional shape that is constant over the entire length in the longitudinal direction (the X-axis direction).

As illustrated in FIG. 6, the fourth light exit unit prisms 48A of this embodiment may have the configuration similar to that of the second light diffusion unit prisms 45A of the second light diffusion portion 45 provided in the second sections A2, although the fourth light exit unit prisms 48A may not necessarily have such a configuration. The fourth light exit unit prisms 48A may have the same shape as that of the second light diffusion unit prisms 45A. Specifically, the arrangement interval between the fourth light exit unit prisms 48A with respect to the Y-axis direction is about 0.03 mm and constant and the depth measured from the bottom to the vertex is about 0.015 mm and constant. The fourth light exit unit prism 48A has an isosceles triangular cross-sectional shape and includes a pair of sloped surfaces 48A1. Each of the sloped surfaces 48A1 is inclined at an angle of from 37.5° to 45° inclusive (for example, 45°) with respect to the normal direction of the second light exit surface 40B. The vertex angle θ7 between the pair of sloped surfaces 48A1 is preferably 75° or greater and 90° or smaller and may be about 90°, for example. In the fourth light exit lens portion 48, with the prisms of the same shape being arranged continuously, the fourth light exit lens portion 48 has a cross-sectional shape of a saw blade shape (a zig-zag shape). The third light exit unit prisms 47A are between the fourth light exit unit prisms 48A and the second light diffusion unit prisms 45A. The fourth light exit unit prisms 48A and the second light diffusion unit prisms 45A have the same cross-sectional shape and are on the same extending lines, respectively.

According to such a configuration, the light rays that are supplied in the X-axis direction from the LEDs 22 by the third light exit lens portion 47 are totally reflected by the sloped surfaces 48A1 of the fourth light exit unit prisms 48A of the fourth light exit lens portion 48 and travel along the Y-axis direction so as to be farther away from the second light exit surface 40B. The light rays that have been totally reflected by the sloped surfaces 48A1 of the fourth light exit unit prisms 48A are reflected by the second light entering surface 40A and travel toward the second light exit surface 40B again. Some of the light rays travelling toward the second light exit surface 40B again may exit through the sloped surfaces 48A1 of the fourth light exit unit prisms 48A or the sloped surfaces 47A1 of the third light exit unit prisms 47A. Thus, the light rays travelling within the second light guide plate 40 can be mixed with respect to the X-axis direction and the Y-axis direction and this suppresses luminance unevenness effectively. Moreover, in the fourth light exit lens portion 48, the depth of the fourth light exit unit prism 48A is smaller than the depth of the third light exit unit prism 47A. According to such a configuration, the sloped surface 47A1 of the third light exit unit prism 47A can have a larger area compared to a configuration in which the relations of the depth dimensions of the unit prisms are opposite from the above ones. With such a configuration, the amount of light rays that exit through the sloped surface 47A1 of the third light exit lens portion 47 can be increased and the light can be diffused by the second light guide plate 40 effectively and uniformly in the X-axis direction and the Y-axis direction.

Examples related to the technology described herein will be described below; however, the technology described herein is not limited to the examples. Test examples 1 to 3 and backlights and liquid crystal display devices of test examples 1 to 3 will be described.

Test Example 1

Figure 11:
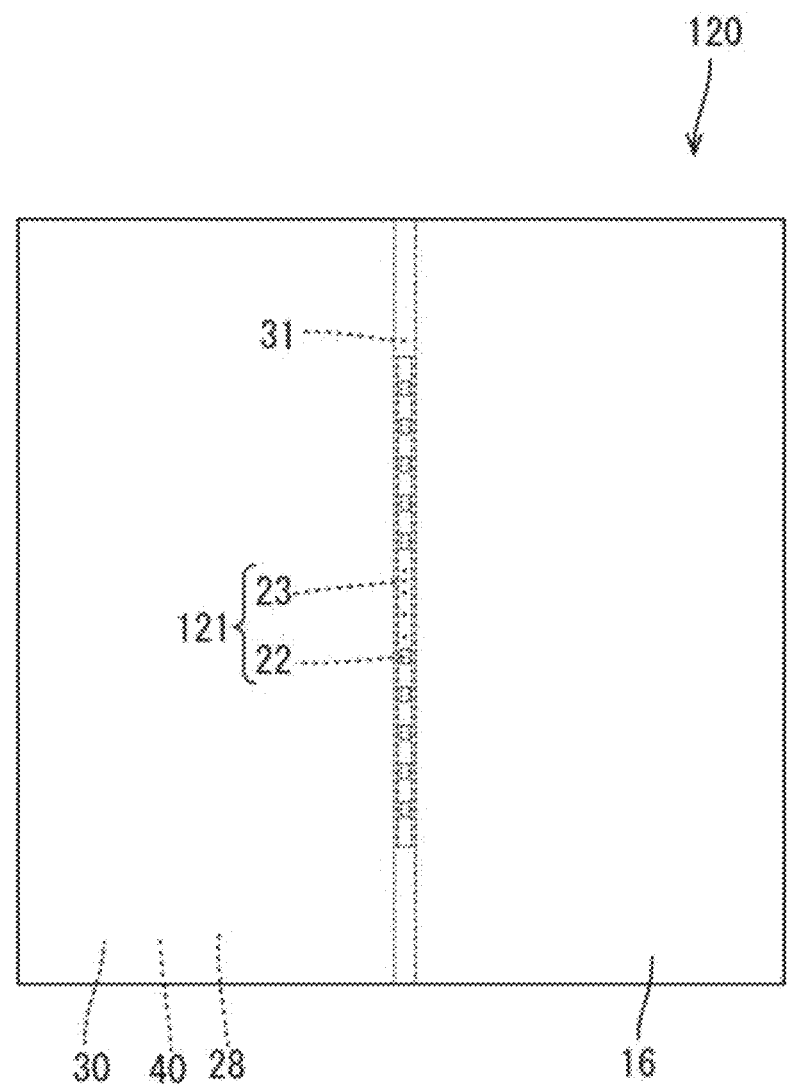
FIG. 11 is a bottom view of a backlight produced in test example 1.

In test example 1, the optical sheet component, the second light guide plate, the first light guide plate, the LED unit, and the reflective sheet are disposed on top of each other in this order and a backlight 120 including a configuration described in FIG. 11 is prepared. The backlight 120 of example 1 has a substantially square plan view outline shape and includes one LED board 23. More specifically, a dimension of each side of a lighting region is about 40 mm and the backlight 120 is larger than the lighting region. A LED unit 121 includes a rectangular base board having a longitudinal dimension of about 20 mm and ten LEDs (total radiant flux: about 6.5 mW) on the base board. Each of the LEDs has a size of about 0.3 mm×about 0.6 mm and the LEDs are arranged linearly at equal intervals. The interval between the centers of the respective LEDs is 2.15 mm (at intervals of about 2 mm). The interval is large enough compared to the arrangement interval of the LEDs in the prior configuration. The first light guide plate does not include the sloped surfaces on the first light entering surface. The LED unit is fixed to a middle section of the first light guide plate with respect to the X-axis direction and the Y-axis direction with a double-sided adhesive tape. The first light guide plate and the second light guide plate include the first section and the second section, respectively, that cover the LED unit. Other sections of the first light guide plate and the second light guide plate are the fourth sections and the third sections, respectively. The lens included in the second section and the third section is configured such that the angle of the sloped surfaces and the orientation of the ridgeline are varied as described below.

The backlight 120 of example 1 has the configuration similar to that of the backlight 20 (refer to FIG. 1 and other drawings, for example), which is described before the description of the test example, except for the above-described configuration. Specifically, the first light guide plate includes the first light diffusion portion (the prism portion) in the first section and includes the fifth lens and the sixth lens in the fourth sections. The second light guide plate includes the second light diffusion portion in the second section and includes the second lens and the third lens in the third sections. The second light diffusion portion in the second section includes prisms (the first lens) whose ridgelines extend along the X-axis direction. The second lens in the third section includes prisms whose ridgelines extend along the X-axis direction and the third lens includes prisms whose ridgelines extend along the Y-axis direction. In this test example, two sloped surfaces of each unit prism are inclined with respect to the normal direction of the first light exit surface 30B and the second light exit surface 40B at a same inclination angle to check the influence of the inclination angle relative to the normal direction precisely. The total (double) of the inclination angles of the two sloped surfaces is described as the vertex angle. In such a backlight 120, the vertex angle θ1 of the light diffusion unit prism of the first light diffusion portion is 60°, the vertex angle θ2 of the light entering unit prism of the first light entering prism portion is 80°, the vertex angle θ3 of the first light exit unit prism of the first light exit lens portion is 90°, and the vertex angle θ4 of the second light exit unit prism of the second light exit lens portion is 90°. The vertex angle θ5 of the second light diffusion unit prism of the second light diffusion portion is 90°, the vertex angle θ6 of the third light exit unit prism of the third light exit lens portion is 90°, and the vertex angle θ7 of the fourth light exit unit prism 48A of the fourth light exit lens portion 48 is 90°.

The dimension of the LED measured in the width direction (the X-axis direction) is about 0.3 mm and the dimension measured in the longitudinal direction (the Y-axis direction) is about 0.6 mm. As to the first light guide plate 30 and the second light guide plate 40, the dimensions along the X-axis direction of the light entering top portion 31A1, the first light diffusion portion 35, the bottom section 35B, and the second light diffusion portion 45 (the second light diffusion unit prism 45A) are 0.5 mm, 1 mm, 0.2 mm, and 2.4 mm, respectively. The second light diffusion unit prism 45A has an isosceles triangular cross-sectional shape and the width of the bottom of the triangular cross-sectional shape is 0.03 mm and the depth measured from the bottom to the top is 0.015 mm. The second light diffusion unit prisms 45A are continuously formed along the Y-axis direction. The second light diffusion portion 45 only includes the second light diffusion unit prisms 45A and does not include prisms (for example, the third light exit unit prisms 47A) whose ridgelines extend in other direction.

A backlight that includes the first light guide plate but does not include the second light guide plate is prepared as comparative example 1. Other configuration of the backlight of comparative example 1 is same as that of example 1. A backlight having the following configuration is prepared as comparative example 2. The light guide plate including only the second sections and without including the third sections is prepared by forming the second light diffusion portion on an entire area of the second light exit surface of the second light guide plate. The light guide plate is disposed on the first light guide plate such that the ridgelines of the light diffusion unit prisms extend along the Y-axis direction and the light diffusion unit prisms are arranged in the X-axis direction. Other configuration of the backlight is same as that of example 1.

Figure 12:
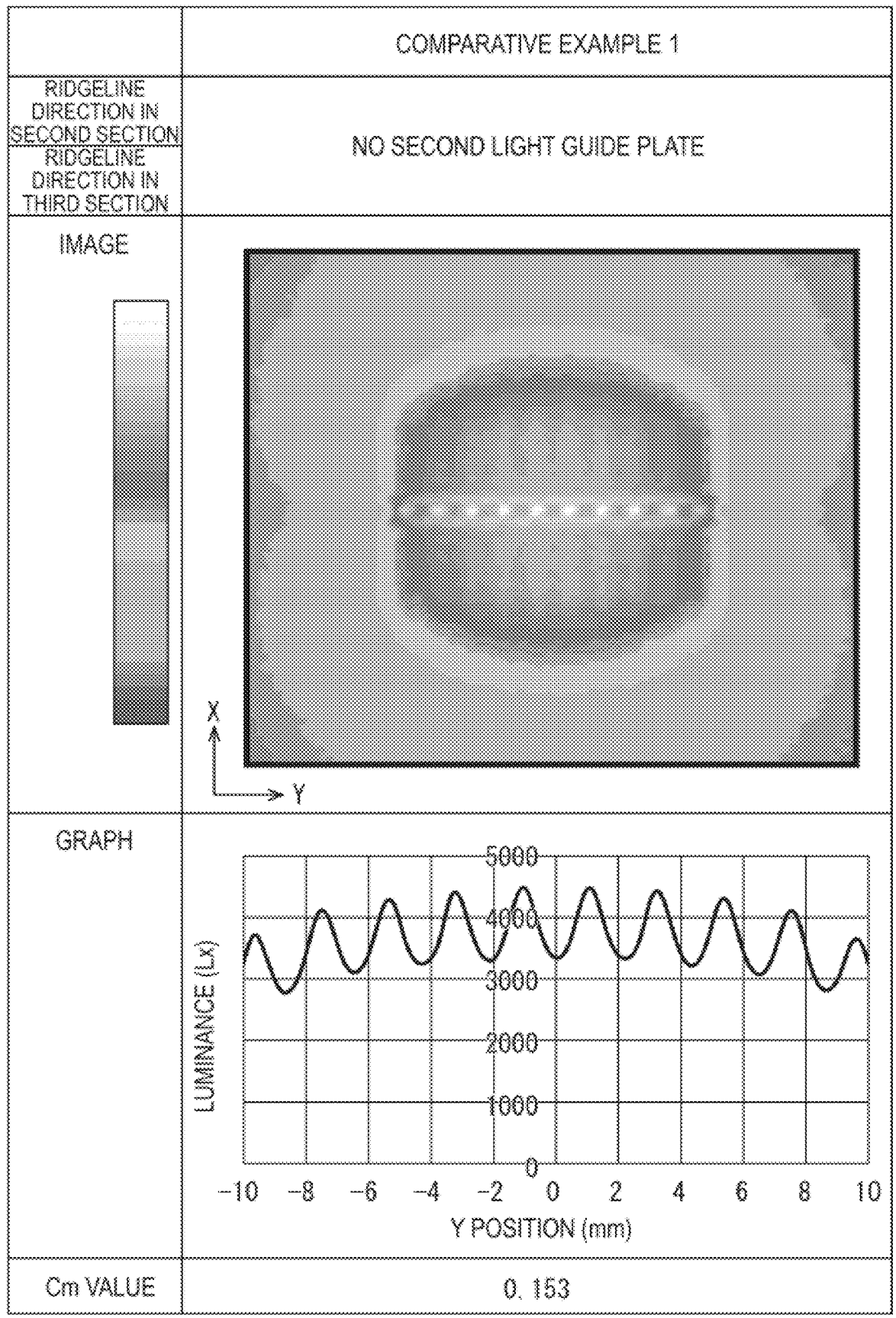
FIG. 12 is a table presenting experiment results of comparative example 1.
Figure 13:
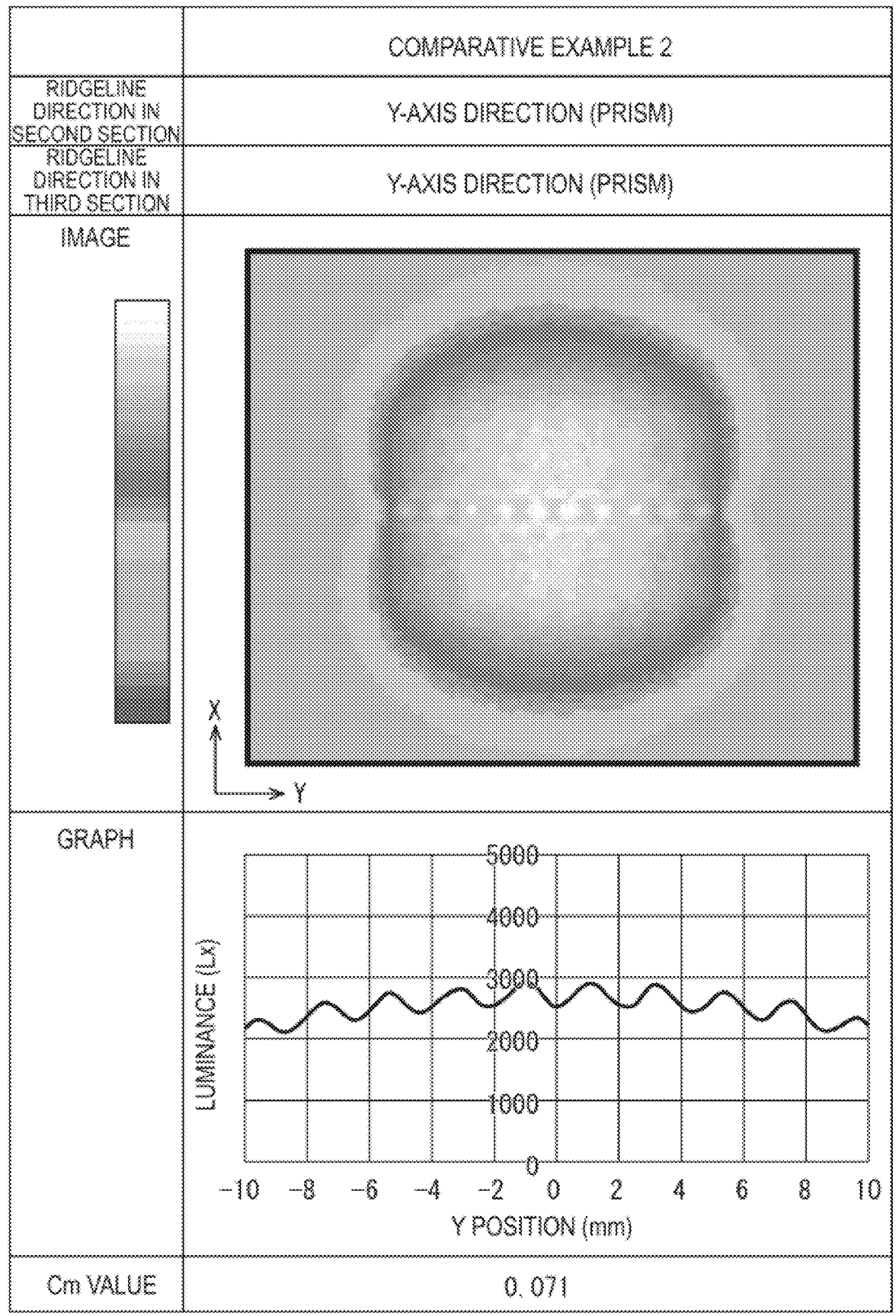
FIG. 13 is a table presenting experiment results of comparative example 2.

In each of the backlights of examples 1 and comparative examples 1 and 2, a luminance distribution of the lighting region with all of the LEDs being lighted was measured with a digital luminance meter in accordance with JIS Z 8513-1994 and an image representing the result was obtained. A graph relating the luminance distribution in the middle section (corresponding to the position of the LED unit) of the lighting region of each backlight with respect to the X-axis direction was obtained and Michelson Contrast (Cm) value was measured. The results are illustrated in FIGS. 12 to 14. FIGS. 12 to 14 illustrate the results of comparative examples 1, 2 and example 1, respectively. The horizontal axis of the graph of each of FIGS. 12 to 14 represents coordinate positions with the middle position of the lighting region with respect to the Y-axis direction being as a reference position (0). The graphs represent luminance distributions in the lighting region ranging from −10 mm to +10 mm in which the LED unit is arranged.

As illustrated in FIG. 12, since the backlight of comparative example 1 does not include the second light guide plate, the light emitted by the LEDs is less likely to be diffused in the Y-axis direction. Therefore, the positions of ten LEDs that are arranged at intervals of about 2 mm were clearly observed as hot spots at the middle section (corresponding to the first section and the second section) with respect to the X-axis direction including the LED unit. This can be observed from the graph in FIG. 12 in which the luminance greatly increases at the Y-axis positions corresponding to the ten LEDs, respectively. In the backlight of comparative example 1, the light is not efficiently diffused with respect to the Y-axis direction in the sections (corresponding to the third section and the fourth section) of the lighting region in which the LED unit is not disposed. The sections having relatively high luminance extend toward the plus side and the minus side with respect to the X-axis direction from the positions of the LEDs (the hot spots) and luminance unevenness was observed. It becomes obvious from the above that the luminance unevenness needs to be greatly improved in the backlight of comparative example 1.

As illustrated in FIG. 13, in the backlight of comparative example 2, the second light guide plate includes prisms having a triangular cross-sectional shape same as that of the first light diffusion unit prisms 36A on the entire surface of the second light guide plate. The orientation of the second light guide plate is adjusted such that the ridgelines of all the prisms extend in the Y-axis direction. Therefore, the second light guide plate of comparative example 2 is configured to diffuse the light emitted by the LEDs in the X-axis direction effectively. Compared to comparative example 1, the luminance unevenness is improved over an entire area of the lighting region and the effects can be confirmed with the graph representing the luminance distribution and the Cm value. However, as is obvious from the luminance distribution, the positions of the LEDs that are arranged at intervals of about 2 mm can be observed as the hot spots. It becomes obvious that the luminance distribution relative to the Y-axis direction needs to be improved in the backlight of comparative example 2.

As illustrated in FIG. 14, in a backlight of example 1, the hot spots corresponding to the positions of the LEDs were not observed in the middle section with respect to the X-axis direction including the LED unit and it was confirmed that the luminance unevenness was greatly improved. Since the second light guide plate includes the second light diffusion portion that covers the LED unit, the light emitted by the LED unit was effectively diffused in the Y-axis direction by the second light diffusion portion. As a result, as illustrated with the graph in FIG. 14, the luminance distribution may become quite uniform. In the luminance distribution, the high luminance region is in the middle section of the lighting region; however, luminance changes smoothly in the luminance distribution and a local high luminance portion was not observed. This represents that the second light guide plate is effective for diffusing light in the Y-axis direction and also for diffusing light uniformly on a X-Y plane surface. This can be confirmed from the Cm value that is decreased to ¼ of that of comparative example 2.

Test Example 2

In test example 2, the second light guide plate included in the backlight of example 1 in test example 1 was used and the luminance distribution in the middle section (corresponding to the position of the LED row) with respect to the X-axis direction was measured and the Cm values were obtained with the vertex angle θ5 of the light diffusion unit prism of the second light diffusion portion being varied from 90°. In test example 2, six second light guide plates were prepared. The light diffusion unit prisms of the six second light guide plates have vertex angles θ5 of 70°, 80°, 90° (experiment example 1), 100°, 110°, and 140°, respectively. Backlights of samples 1 to 6 including the respective six second light guide plates were prepared.

For comparison, a backlight of sample 7 was produced with using a so-called lenticular lens that has a semicircular cross-sectional shape as the light diffusion unit prisms of the second light diffusion portion. The cross-sectional shape of the lenticular lens of sample 7 has a diameter that matches the bottom dimension of the triangular cross section of the light diffusion unit prisms of samples 1 to 6.

Figure 15:
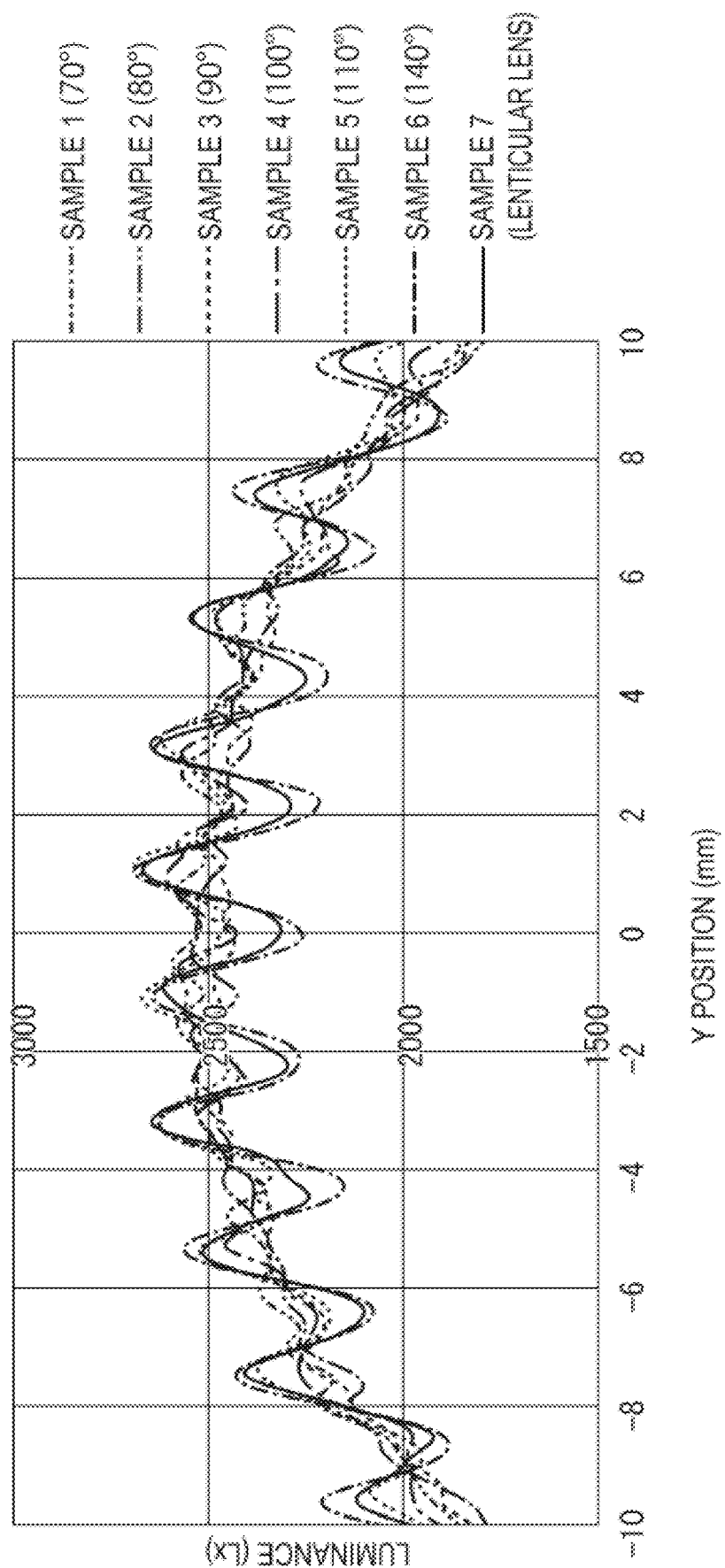
FIG. 15 is a graph presenting experiment results of test example 2.

The luminance distributions of the backlights of samples 1 to 7 were obtained similar to test example 1 and the results are illustrated in FIG. 15. The Cm values were calculated from the results of the luminance distributions and are illustrated in FIG. 16. As illustrated in examples in FIG. 15 and the tables in FIG. 16, the vertex angle θ5 of the light diffusion unit prisms of sample 1 is 70°, the vertex angle θ5 of the light diffusion unit prisms of sample 2 is 80°, the vertex angle θ5 of the light diffusion unit prisms of sample 3 is 90°, the vertex angle θ5 of the light diffusion unit prisms of sample 4 is 100°, and the vertex angle θ5 of the light diffusion unit prisms of sample 5 is 110°. The second light diffusion portion of sample 7 includes a lenticular lens.

As illustrated in FIG. 15, it was found that the characteristics of the luminance distributions of the backlights are greatly influenced by changing the vertex angle θ5 of the light diffusion unit prisms of the second light diffusion portion of the second light guide plate. Specifically, the following tendencies are observed. As the position with respect to the Y-axis direction becomes closer to 0 mm from −10 mm, the luminance of the backlights generally increases. As the position with respect to the Y-axis direction becomes closer to +10 mm from 0 mm, the luminance of the backlights generally decreases. As to samples 1 to 3 including the light diffusion unit prisms with the vertex angles θ5 from 70° to 90°, when the position with respect to the Y-axis direction is varied from −10 mm to +10 mm, it was found that the luminance of the backlights slightly changes at the positions having the LEDs and local increase or decrease in the luminance was not observed. The Cm values relative to the luminance distributions of samples 1 to 3 are relatively small values in a range from 0.025 to 0.016. It was found that the light from the LEDs can be diffused by the second light guide plate more effectively by setting the vertex angle θ5 closer to 90°.

As to sample 4 including the light diffusion unit prisms whose vertex angle θ5 is 100° and sample 5 including the light diffusion unit prisms whose vertex angle θ5 is 110°, when the position with respect to the Y-axis direction is varied from −10 mm to +10 mm, it was observed that luminance at the positions of the LEDs slightly increases or luminance at the middle positions between the adjacent LEDs decreases. The Cm values relative to the luminance distributions of samples 4 and 5 are 0.041 and 0.052, respectively. It was found that the diffusing effects of the light from the LEDs by the second light guide plate may be slightly decreased by setting the vertex angle θ5 slightly greater than 90°.

As to sample 6 including the light diffusion unit prisms whose vertex angle θ5 is 140°, when the position with respect to the Y-axis direction is varied from −10 mm to +10 mm, it was observed that luminance at the positions of the LEDs greatly increases and luminance at the middle positions between the adjacent LEDs decreases. In the luminance distribution of sample 6, increase and decrease in the luminance were greatest among all samples and it may not be preferable to increase the vertex angle θ5 of the light diffusion unit prisms to 140°.

As to sample 7 including the lenticular lens in the second light diffusion portion of the second light guide plate, when the position with respect to the Y-axis direction is varied from −10 mm to +10 mm, although increase and decrease in the luminance were smaller than those in sample 6, it was observed that luminance at the positions of the LEDs greatly increases and luminance at the middle positions between the adjacent LEDs decreases.

From the above results, the vertex angle θ5 of the light diffusion unit prisms of the second light diffusion portion of the second light guide plate is preferably in a range from 70° to 110° and more preferably in a range from 80° to 90°. The light diffusion unit prisms of the second light diffusion portion of the second light guide plate preferably have a polygonal columnar shape having a triangular cross-sectional shape rather than a semicircular cross-sectional shape.

Second Embodiment

Figure 17:
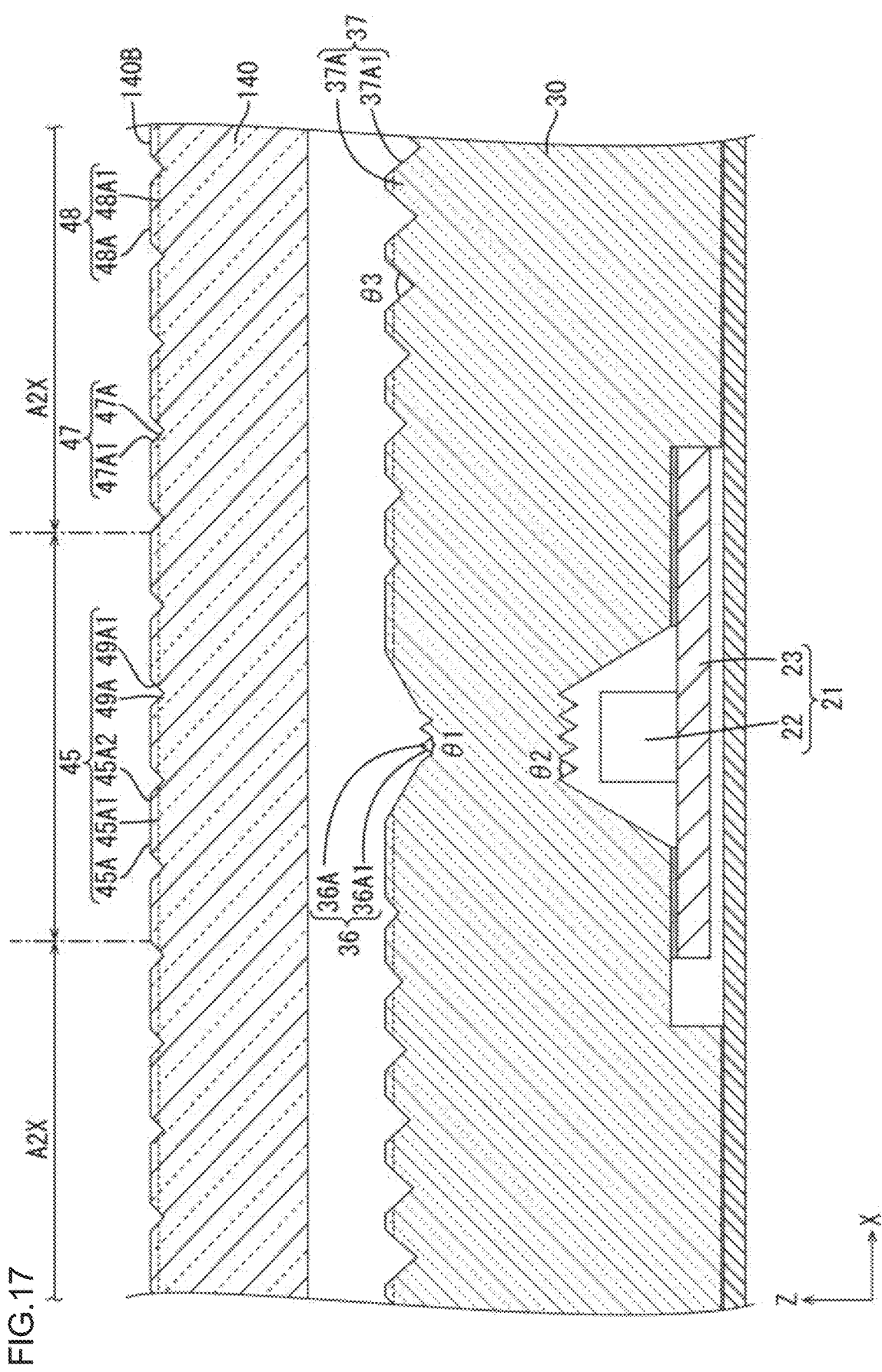
FIG. 17 is an exploded cross-sectional view of a portion of a backlight according to a second embodiment.

A backlight according to a second embodiment will be described with reference to FIG. 17. In the backlight of the second embodiment, the second light diffusion portion 45 of a second light guide plate 140 includes third light exit unit prisms 49A (a fourth lens) in addition to the second light diffusion unit prisms 45A. The third light exit unit prism 49A has a recessed shape recessed from a second light exit surface 140B and extends along the arrangement direction (the Y-axis direction). The third light exit unit prisms 49A are arranged at intervals in the direction (the X-axis direction in this embodiment) crossing the arrangement direction. The second light diffusion unit prisms 45A extend along the direction (the X-axis direction in this embodiment) crossing the arrangement direction and are arranged in the arrangement direction in portions between the adjacent third light exit unit prisms 49A. In other words, in the backlight of the second embodiment, with the second light diffusion portion 45 including the third light exit unit prisms 49A that extend in the arrangement direction, the second sections A2 and the third sections A2X have the same surface configuration. Configurations other than the above configuration are similar to those of the first embodiment and the configuration, operation, and effects similar to those of the first embodiment will not be described.

The luminance distribution of the backlight of the second embodiment (example 2) was obtained similar to test example 1 and the Cm values were calculated from the results of the luminance distribution and are illustrated in FIG. 18. As illustrated in FIG. 18, in the backlight of example 2, the hot spots corresponding to the positions of the LEDs were less likely to be observed in the middle section with respect to the X-axis direction including the LED unit and it was confirmed that the luminance unevenness was greatly improved. For example, the Cm value relative to the backlight of example 2 is 0.035 and is much smaller than that of comparative example 1. It was found that the light can be diffused in the Y-axis direction effectively by the second light guide plate of the backlight according to the second embodiment. Such effects are obtained because the second light diffusion unit prisms 45A are provided in a most area of the second section A2 even with the third light exit unit prisms 49A being provided in the second section A2 of the second light guide plate of example 2. From this, it is obvious that the second section A2 does not necessarily include the second light diffusion unit prisms 45A on an entire surface thereof. However, in the backlight of example 2, it was observed that the effect of reducing luminance unevenness was slightly decreased compared to the backlight of example 1. Therefore, when the LEDs are arranged at greater intervals than those of the prior configuration (in other words, the number of LEDs is reduced), it is desirable to increase the number of second light diffusion unit prisms 45A or the area occupied by the second light diffusion unit prisms 45A.

OTHER EMBODIMENTS

The technology described herein is not limited to the embodiments described in this specification and illustrated in the drawings. For example, the following embodiments may be included in the technical scope of the present invention.

(1) The sloped surfaces 45A1 of the second light diffusion unit prisms 45A may not be planar surfaces but may be non-planar light reflecting surfaces such as arched surfaces as long as the angle between the sloped surface 45A1 and the normal direction of the second light exit surface 40B is from 35° to 55° inclusive. The first light diffusion portion 35 may include non-planar light reflecting surfaces such as arched surfaces instead of the light exit sloped surfaces 35A.

(2) The ridgelines 45A2 of the second light diffusion unit prims 45A may be at a same level (on a same plane) as the ridgelines of the fourth light exit lens portion 48. One of the ridgelines 45A2 or the ridgelines of the fourth light exit lens portion 48 may be at a higher level than the other one of them. The first light diffusion portion 35 may include recessed-type prisms that are formed by projecting portions of the first light exit surface 30B of the first light guide plate 30.

(3) The second light diffusion portion 45 and the fourth light exit lens portion 48 may be formed by mounting the second light diffusion unit prisms 45A and the fourth light exit unit prisms 48A on the second light guide plate 40, which is a flat base plate. The first light diffusion portion 35 may be formed by disposing material different from that of the first light guide plate 30 on the first light exit surface 30B. The second light diffusion portion 45, the fourth light exit lens portion 48, and the first light diffusion portion 35 may have any configuration as long as they can exert the respective diffusion actions.

(4) A light diffusion lens portion of a lenticular lens may be included instead of the first light diffusion prism portion 36. In such a configuration, the light diffusion lens portion includes light diffusion unit cylindrical lenses that extend along the Y-axis direction.

Figure 19:
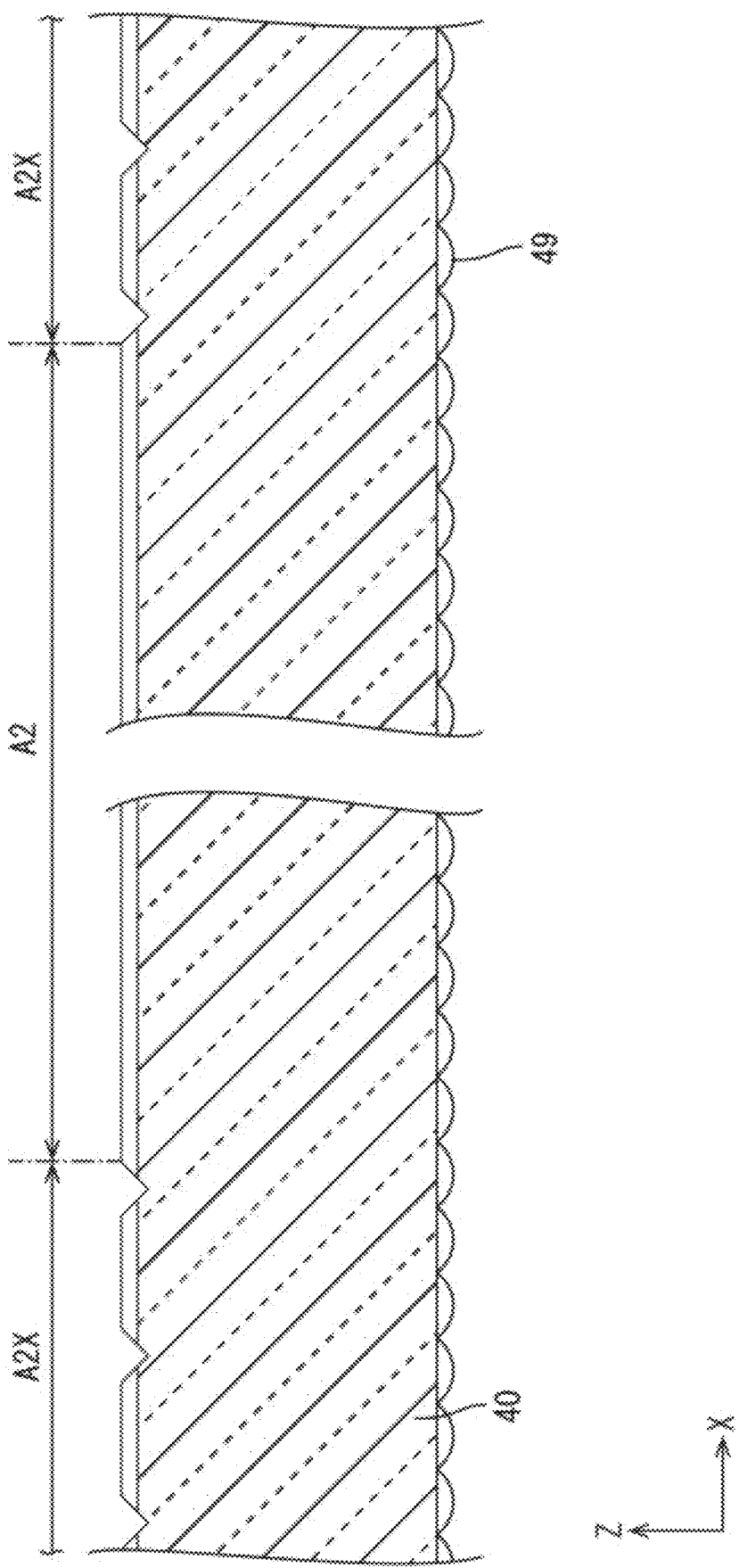
FIG. 19 is a cross-sectional view illustrating another configuration of the second light guide plate.

(5) As illustrated in FIG. 19, the second light guide plate 40 may include a light entering lens portion 49 of a lenticular lens on the second light entering surface 40A. In such a configuration, the light entering lens portion 49 includes light entering unit cylindrical lenses that extend along the Y-axis direction.

(6) The light entering prism portion 32 may not be included.

(7) The third light exit lens portion 47 and the first light exit lens portion 37 may be separately provided as a third light exit lens portion and a first light exit lens portion each of which is configured as a lenticular lens. In such a configuration, the third light exit lens portion 47 and the first light exit lens portion include third light exit unit cylindrical lenses and first light exit unit cylindrical lenses, respectively.

(8) The third light exit lens portion 47 and the first light exit lens portion 37 may not be included.

(9) The fourth light exit lens portion 48 and the second light exit lens portion 38 may not be included.

(10) The first housing section 31A may not be shifted with respect to the LED board 23 but may be provided such that centers of the LED board 23 and the first housing section 31A with respect to the X-axis direction match each other.

(11) The number of LED units 21 and the interval between the LED units 21 may be altered as necessary.

(12) The LED unit 21 may include multiple LED rows on the mount surface 23A of one LED board 23.

(13) The specific number of and the specific interval between the LEDs 22 included in the row mounted on the LED board 23 may be altered as necessary.

(14) The specific shape and the specific outer dimension of the LED 22 may be altered as necessary.

(15) The LEDs 22 may be chip scale package (CSP) type LEDs.

(16) The LED 22 may emit light through a top surface and may not emit through side surfaces. The LED may emit light through a side surface and may not emit through a top surface.

(17) The reflective sheet 27 may be made of synthetic resin as a whole and have a white surface having good light reflection properties. The reflective sheet 27 may include a synthetic resin base member and metal such as silver disposed on a surface of the base member with deposition and have a silver surface having good light reflection properties.

(18) The specific number, the specific disposing order, and the specific kind of the sheets of the optical sheet component 28 may be altered as necessary.

(19) The light source may be LEDs that emit light other than blue. In such a configuration, the color of light that is emitted by the phosphor included in the wavelength conversion sheet 28A may be altered according to the color of light emitted by the LED such that the backlight 20 exits white light. For example, when using the LEDs emitting magenta light, the wavelength conversion sheet 28A may include green phosphors emitting light of green that is a complementary color of magenta. Thus, the backlight 20 can exit white light (exit light).

(20) The wavelength conversion sheet 28A may be configured to include only yellow phosphors as the phosphor and may be configured to include red phosphors and green phosphors in addition to the yellow phosphors.

(21) The optical sheet component 28 may not include the wavelength conversion sheet 28A. In such a configuration, the LEDs, which are the light source, are configured to emit white light. Such LEDs that emit white light preferably include at least blue LED chips emitting blue light and sealing material that includes green phosphors and red phosphors that emit green light and red light, respectively, when excited by the blue light emitted by the LED chips. However, the configuration is not limited to this. Instead of the wavelength conversion sheet 28A, a diffuser sheet for diffusing light is preferably included but may not be necessarily included.

(22) The light source may not be the LEDs 22 but may be organic EL elements or laser diodes.

(23) The display panel may not be the liquid crystal panel 10 but may be another kind of a display panel (such as a micro electro mechanical system (MEMS) display panel).

(24) The two sloped surfaces of each unit prism in the examples are inclined at the same angle with respect to the normal direction of the first light exit surface 30B or the second light exit surface 40B. However, the two sloped surfaces of each unit prism may be inclined at different angles with respect to the normal direction. For example, the unit prism may have right triangle cross-sectional shape (such as Fresnel lens or linear Fresnel lens) and one of two surfaces of each unit prism may extend along the normal direction and other one may be inclined with respect to the normal direction. According to such a configuration, a greater number of sloped surfaces that are inclined at a predefined angle with respect to the light source can be included in a unit surface area and this improves the action of diffusing the light from the light source in a predefined direction by the unit prisms. Eventually, the light can be supplied with reducing unevenness in the light rays emitted by the light sources arranged at intervals.

(25) The non-forming portions of the first light entering surface 30A of the first light guide plate 30 having no light source housing recesses 31 may not have flat surfaces but may have sloped surfaces. The sloped surfaces are inclined such that ends of the sloped surfaces that are continuous from the light source housing recess 31 are disposed closest to the back side (at a lowest position) and the sloped surfaces extend away from the light source housing recess 31 in the X-axis direction and closer to the first light exit surface 30B with respect to the Z-axis direction (in other words, such that the first light guide plate 30 becomes thinner). With such sloped surfaces, the light rays travelling within the first light guide plate 30 toward the first light entering surface 30A can be reflected in a direction closer to the Z-axis direction. Accordingly, the light rays travelling toward the first light entering surface 30A can be directed vertically and are less likely to reflect off the first light exit surface 30B and more likely to exit through the first light exit surface 30B. The sloped surfaces may change the inclination angle between the two light source housing recesses 31 so as to form a recess that is recessed toward the front side. The sloped surfaces are closest (at the highest position) to the first light exit surface 30B at the middle of the portion between the two light source housing recesses 31.

The invention claimed is:

1. A lighting device comprising: light sources arranged in an arrangement direction; a first light guide plate guiding light rays emitted by the light sources, the first light guide plate including: a first light entering surface opposed to the light sources, a first light exit surface that is on an opposite side from the first light entering surface, the first light exit surface including a first section that extends along the arrangement direction and covers the light sources, and a first light diffusion portion included in the first section and configured to refract light rays travelling from the light sources toward the first section travel in a crossing direction crossing the arrangement direction; and a second light guide plate disposed on the first light guide plate and guiding light rays that exit through the first light exit surface, the second light guide plate including: a second light entering surface opposed to the first light guide plate, a second light exit surface that is on an opposite side from the second light entering surface, the second light exit surface including a second section that extends along the arrangement direction and covers the first section, and a second light diffusion portion included in the second section and configured to refract light rays travelling from the second light entering surface toward the second section along a normal direction of the second light exit surface travel in the arrangement direction seen from the normal direction of the second light exit surface, the second light diffusion portion including first lenses that include ridgelines extending in the crossing direction and inclined portions inclined at an angle from 35° to 55° inclusive with respect to the normal direction; wherein the second light exit surface includes a third section that is different from the second section and does not overlap the light source, the second light guide plate further includes: second lenses that are in the third section, the second lenses having ridgelines that extend in the crossing direction and a cross-sectional shape taken along the arrangement direction that is the same as a cross-sectional shape of the first lenses, and third lenses that are in the third section, the third lenses having a recessed shape that extends along the arrangement direction, the third lenses being away from each other in the crossing direction, and the second lenses are arranged in the arrangement direction between the third lenses that are adjacent to each other.

2. The lighting device according to claim 1, wherein the first lenses include prism portions each having a triangular columnar shape.

3. The lighting device according to claim 1, wherein a depth of the third lenses measured from the second light exit surface is greater than a depth of the first lenses measured from the second light exit surface.

4. The lighting device according to claim 1, wherein the third lenses include V-shaped recesses.

5. The lighting device according to claim 1, wherein
the second light diffusion portion further includes third lenses that are in the second section, and
the first lenses are arranged in the arrangement direction between the third lenses that are adjacent to each other.

6. The lighting device according to claim 1, wherein the first light diffusion portion has a recessed form extending in the crossing direction and including two sloped surfaces each of which is inclined at an obtuse angle with respect to the first light exit surface.

7. The lighting device according to claim 1, wherein
the first light exit surface includes a light source non-overlapping section that is different from the first section and does not overlap the light sources,
the first light guide plate further includes:
a first light exit lens portion in the light source non-overlapping section, the first light exit lens portion being configured to refract light rays travelling from the first light entering surface toward the first light exit surface along a normal direction of the first light exit surface to travel in the crossing direction and to be away from the light sources, and
a second light exit lens portion in the light source non-overlapping section, the second light exit lens portion being configured to refract the light rays travelling from the first light entering surface toward the first light exit surface along the normal direction of the first light exit surface to travel in the arrangement direction seen from the normal direction of the second light exit surface.

8. A display device comprising:
the lighting device according to claim 1; and
a display panel displaying images using light from the lighting device.

9. The lighting device according to claim 1, wherein the first light diffusion portion has a recessed form extending in the crossing direction.

10. The lighting device according to claim 2, wherein the first lenses are configured not to refract the light rays to travel in the crossing direction.

11. The lighting device according to claim 6, wherein the first light diffusion portion includes a bottom section between the two sloped surfaces and the recessed form is defined by the bottom section and the two sloped surfaces.

12. The lighting device according to claim 11, wherein the bottom section integrally includes a prism portion having a triangular columnar shape and a ridgeline of the prism portion extends along the arrangement direction.

13. The lighting device according to claim 7, wherein the first light exit lens portion and the second light exit lens portion are independent from each other and have a recessed shape.

* * * * *